(12) United States Patent
Akizuki et al.

(10) Patent No.: US 10,191,195 B2
(45) Date of Patent: Jan. 29, 2019

(54) POLARIZING PLATE WITH PRESSURE-SENSITIVE ADHESIVE LAYER

(71) Applicant: NITTO DENKO CORPORATION, Ibaraki-shi, Osaka (JP)

(72) Inventors: Shinsuke Akizuki, Ibaraki (JP); Yuusuke Toyama, Ibaraki (JP); Takaaki Ishii, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 56 days.

(21) Appl. No.: 14/854,219

(22) Filed: Sep. 15, 2015

(65) Prior Publication Data

US 2016/0085007 A1    Mar. 24, 2016

(30) Foreign Application Priority Data

Sep. 19, 2014 (JP) ................................ 2014-191681

(51) Int. Cl.
*G02B 5/30* (2006.01)
*C09J 133/06* (2006.01)

(52) U.S. Cl.
CPC ............ *G02B 5/305* (2013.01); *C09J 133/06* (2013.01); *C09J 133/066* (2013.01)

(58) Field of Classification Search
None
See application file for complete search history.

(56) References Cited

U.S. PATENT DOCUMENTS

| | | |
|---|---|---|
| 6,404,469 B1 | 6/2002 | Kitagawa et al. |
| 6,720,375 B2 | 4/2004 | Suzuki et al. |
| 7,179,528 B2 | 2/2007 | Suzuki et al. |
| 7,291,388 B2 | 11/2007 | Suzuki et al. |
| 8,189,149 B2 | 5/2012 | Satake et al. |
| 9,013,656 B2 | 4/2015 | Hisanaga et al. |

(Continued)

FOREIGN PATENT DOCUMENTS

| | | |
|---|---|---|
| CN | 101479652 A | 7/2009 |
| CN | 102162948 A | 8/2011 |

(Continued)

OTHER PUBLICATIONS

Machine_English_translation_WO_2009069799_A1 ; Endo, Yuki; Polarizing Plate Having Adhesive Layer with High Elastic Modulus and Image Display Device Using the Same; Jun. 4, 2009; WIPO; whole document.*

(Continued)

*Primary Examiner* — Tahseen Khan
(74) *Attorney, Agent, or Firm* — Westerman, Hattori, Daniels & Adrian, LLP

(57) ABSTRACT

There is provided a thin polarizing plate with a pressure-sensitive adhesive layer hardly warping. A polarizing plate with a pressure-sensitive adhesive layer of the present invention includes: first pressure-sensitive adhesive layer, a protective film, and a polarizing film in the stated order, wherein: the polarizing film has a thickness of 13 μm or less; a thickness ratio between the protective film and the polarizing film (thickness of the protective film/thickness of the polarizing film) is from 1.5 to 9.0; and a creep amount when a load of 500 g is applied to the first pressure-sensitive adhesive layer for 1 hour is from 20 μm/h to 300 μm/h.

15 Claims, 3 Drawing Sheets

(56) References Cited

U.S. PATENT DOCUMENTS

| | | | |
|---|---|---|---|
| 9,684,096 B2 | 6/2017 | Takeda et al. | |
| 9,765,244 B2 | 9/2017 | Kim et al. | |
| 2001/0041763 A1 | 11/2001 | Suzuki et al. | |
| 2002/0054262 A1 | 5/2002 | Kitagawa et al. | |
| 2004/0167261 A1 | 8/2004 | Suzuki et al. | |
| 2005/0269020 A1* | 12/2005 | Matsuoka | B32B 33/00 156/235 |
| 2007/0009733 A1 | 1/2007 | Suzuki et al. | |
| 2009/0322994 A1* | 12/2009 | Satake | C09J 133/02 349/96 |
| 2014/0098331 A1 | 4/2014 | Hisanaga et al. | |
| 2014/0186605 A1 | 7/2014 | Kim et al. | |
| 2014/0347730 A1 | 11/2014 | Takeda et al. | |
| 2014/0377550 A1* | 12/2014 | Yasui | C09J 7/0217 428/354 |
| 2015/0002792 A1 | 1/2015 | Hirata et al. | |
| 2015/0293407 A1* | 10/2015 | Iida | G02F 1/133634 349/96 |
| 2015/0368525 A1 | 12/2015 | Yasui et al. | |

FOREIGN PATENT DOCUMENTS

| | | |
|---|---|---|
| CN | 102262316 A | 11/2011 |
| CN | 103911081 A | 7/2014 |
| JP | 2000-321426 A | 11/2000 |
| JP | 2002-030264 A | 1/2002 |
| JP | 2003-50314 A | 2/2003 |
| JP | 2003-195053 A | 7/2003 |
| JP | 2008-014988 A | 1/2008 |
| JP | 2013-077006 A | 4/2013 |
| JP | 2013-218316 A | 10/2013 |
| JP | 2014-081413 A | 5/2014 |
| JP | 2014-089433 A | 5/2014 |
| JP | 2014-156535 A | 8/2014 |
| WO | 2009/069799 A1 | 6/2009 |
| WO | WO2009069799 A1 * | 6/2009 |
| WO | 2011/001836 A1 | 1/2011 |
| WO | WO2015064205 A1 * | 5/2015 |

OTHER PUBLICATIONS

Office Action dated May 9, 2018, issued in Japanese Patent Application No. 2014-191681, with English translation.

Office Action dated May 2, 2018, issued in Chinese Patent Application No. 2015105986793, with English translation.

Third Party Observation dated Nov. 9, 2018, issued in counterpart Japanese application No. 2014-191681, with English translation. (64 pages).

* cited by examiner

POLARIZING PLATE WITH PRESSURE-SENSITIVE ADHESIVE LAYER

This application claims priority under 35 U.S.C. Section 119 to Japanese Patent Application No. 2014-191681 filed on Sep. 19, 2014, which are herein incorporated by references.

BACKGROUND OF THE INVENTION

1. Field of the Invention

The present invention relates to a polarizing plate with a pressure-sensitive adhesive layer.

2. Description of the Related Art

In recent years, the thinning of an image display apparatus, in particular, an image display apparatus for mobile applications has been progressing, and hence there has been a growing requirement for the thinning of a polarizing plate to be used in the image display apparatus. A polarizing plate of the following construction has been proposed as a thin polarizing plate (for example, International Patent WO2009/069799A). A protective film for protecting a polarizing film is not arranged, and a pressure-sensitive adhesive layer is directly formed on the polarizing film so that the polarizing plate can be bonded to any other member.

Meanwhile, an improvement in functionality of the pressure-sensitive adhesive layer to be used in the bonding of the polarizing plate has been required. For example, a pressure-sensitive adhesive layer containing an ionic compound and having an antistatic function, and a pressure-sensitive adhesive layer containing a surfactant and having re-peelability have been known. However, a polarizing plate including a pressure-sensitive adhesive layer directly arranged on a polarizing film as described above involves a problem in that the polarizing film deteriorates owing to an additive in the pressure-sensitive adhesive layer. In addition, the polarizing plate including the pressure-sensitive adhesive layer directly arranged on the polarizing film involves a problem in that a substance in the polarizing film (such as iodine) contaminates any other member as an adherend.

A method involving arranging a protective film only on one side of a polarizing film depending on a pressure-sensitive adhesive to be used is conceivable as a method of solving the problems. However, when a polarizing plate of such construction is bonded to any other member, for example, the following problem occurs. As illustrated in FIG. 5, warping occurs to cause unnecessary peeling of the polarizing film and the protective film or appearance abnormality in an end portion of the polarizing film. Such phenomenon becomes a problem particularly in today's circumstances where an image display apparatus is frequently used under a severe environment (e.g., under high temperature and high humidity) in association with the diversification of environments where the apparatus is used including outdoor use of an image display apparatus for mobile applications.

SUMMARY OF THE INVENTION

The present invention has been made to solve the conventional problems, and a primary object of the present invention is to provide a thin polarizing plate with a pressure-sensitive adhesive layer (more specifically, a polarizing plate in which a protective film is arranged only on one side of a polarizing film), the polarizing plate with a pressure-sensitive adhesive layer hardly warping.

A polarizing plate with a pressure-sensitive adhesive layer of the present invention includes: first pressure-sensitive adhesive layer, a protective film, and a polarizing film in the stated order, wherein: the polarizing film has a thickness of 13 μm or less; a thickness ratio between the protective film and the polarizing film (thickness of the protective film/thickness of the polarizing film) is from 1.5 to 9.0; and a creep amount when a load of 500 g is applied to the first pressure-sensitive adhesive layer for 1 hour is from 20 μm/h to 300 μm/h.

In one embodiment of the present invention, the protective film has a thickness of from 5 μm to 60 μm.

In one embodiment of the present invention, the first pressure-sensitive adhesive layer contains an acrylic pressure-sensitive adhesive.

In one embodiment of the present invention, the acrylic pressure-sensitive adhesive contains an acrylic polymer as a base polymer, and the acrylic polymer is substantially free of a constituent unit having a carboxyl group.

In one embodiment of the present invention, the acrylic pressure-sensitive adhesive contains an acrylic polymer as a base polymer, and the acrylic polymer contains a constituent unit derived from a (meth) acrylic acid alkyl ester and a constituent unit derived from a hydroxyl group-containing monomer.

In one embodiment of the present invention, the hydroxyl group-containing monomer includes 4-hydroxybutyl acrylate.

In one embodiment of the present invention, the acrylic pressure-sensitive adhesive contains a phenol-based antioxidant.

In one embodiment of the present invention, the acrylic pressure-sensitive adhesive contains a base polymer and a plurality of kinds of cross-linking agents; and the plurality of kinds of cross-linking agents each include one of a peroxide-based cross-linking agent, an epoxy-based cross-linking agent, and an isocyanate-based cross-linking agent.

According to another aspect of the present invention, there is provided an optical laminate. The optical laminate includes the polarizing plate with a pressure-sensitive adhesive layer, a second pressure-sensitive adhesive layer, and an optical film in the stated order, wherein the second pressure-sensitive adhesive layer is arranged on a surface of the polarizing film of the polarizing plate with a pressure-sensitive adhesive layer on a side opposite to the protective film.

In one embodiment of the present invention, the second pressure-sensitive adhesive layer has a thickness of from 3 μm to 18 μm.

In one embodiment of the present invention, the optical film has a thickness of from 10 μm to 30 μm.

In one embodiment of the present invention, the optical film comprises a brightness enhancement film.

In one embodiment of the present invention, the optical laminate has a thickness of 100 μm or less.

In one embodiment of the present invention, when a surface of the optical laminate on a protective film side and a non-alkali glass are bonded to each other through a pressure-sensitive adhesive, and the optical laminate is placed under a 70° C. environment for 200 hours, a shrinkage ratio of the optical laminate in an absorption axis direction of the polarizing film is 0.4% or less.

According to another aspect of the present invention, there is provided a method of producing the optical laminate. The method of producing the optical laminate includes producing each of the polarizing plate with a pressure-sensitive adhesive layer, and a laminate I of the optical film and the second pressure-sensitive adhesive layer; and laminating the polarizing plate with a pressure-sensitive adhesive layer and the laminate I.

According to the embodiment of the present invention, the first pressure-sensitive adhesive layer showing a specific creep amount, the protective film, and the thin polarizing film are laminated in the stated order, and the thickness ratio between the protective film and the polarizing film (thickness of the protective film/thickness of the polarizing film) is set to from 1.5 to 9.0, whereby a thin polarizing plate with a pressure-sensitive adhesive layer that uses only one protective film is obtained, and a polarizing plate with a pressure-sensitive adhesive layer that hardly warps under high temperature or under high temperature and high humidity despite such construction can be obtained. The polarizing plate with a pressure-sensitive adhesive layer according to the embodiment of the present invention hardly warps, and hence unnecessary interlayer peeling (peeling between the first pressure-sensitive adhesive layer and the protective film) and foaming can be prevented, and appearance abnormality occurring in an end portion of the polarizing plate can be prevented.

DETAILED DESCRIPTION OF THE PREFERRED EMBODIMENTS

Figure 1:
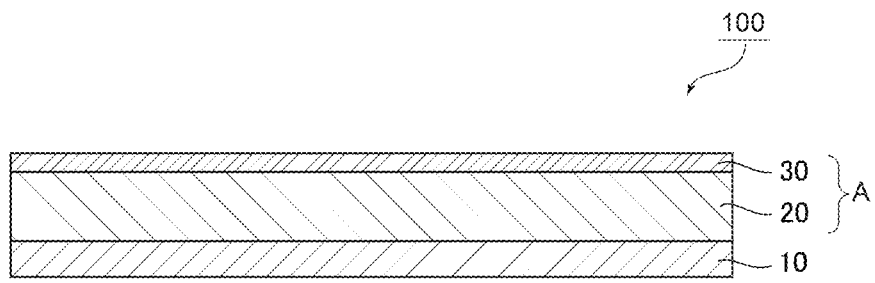
FIG. 1 is a schematic sectional view of a polarizing plate with a pressure-sensitive adhesive layer according to one embodiment of the present invention.

A. Entire Construction of Polarizing Plate with Pressure-sensitive Adhesive Layer FIG. 1 is a schematic sectional view of a polarizing plate with a pressure-sensitive adhesive layer according to one embodiment of the present invention. A polarizing plate 100 with a pressure-sensitive adhesive layer of FIG. 1 includes a first pressure-sensitive adhesive layer 10, a protective film 20, and a polarizing film 30 in the stated order. The thickness of the polarizing film 30 is 13 µm or less. In addition, a thickness ratio between the protective film 20 and the polarizing film 30 (protective film/polarizing film) is from 1.5 to 9.0. The polarizing plate with a pressure-sensitive adhesive layer of the present invention includes only one protective film. It should be noted that the polarizing plate with a pressure-sensitive adhesive layer of the present invention can include any appropriate other layer, though the layer is not shown. For example, the plate may include an anchor layer between the first pressure-sensitive adhesive layer and the protective film.

In the present invention, arranging the protective film 20 between the first pressure-sensitive adhesive layer 10 and the polarizing film 30 prevents the movement of a component in the first pressure-sensitive adhesive layer such as a tackifier, an antistatic material, a surfactant, or a monomer component to the polarizing film, and hence prevents the deterioration of the polarizing film (such as a reduction in its transmittance). In addition, the arrangement prevents the movement of a component in the polarizing film (such as iodine or potassium) to an adherend, and hence prevents the contamination of the adherend.

Figure 2:
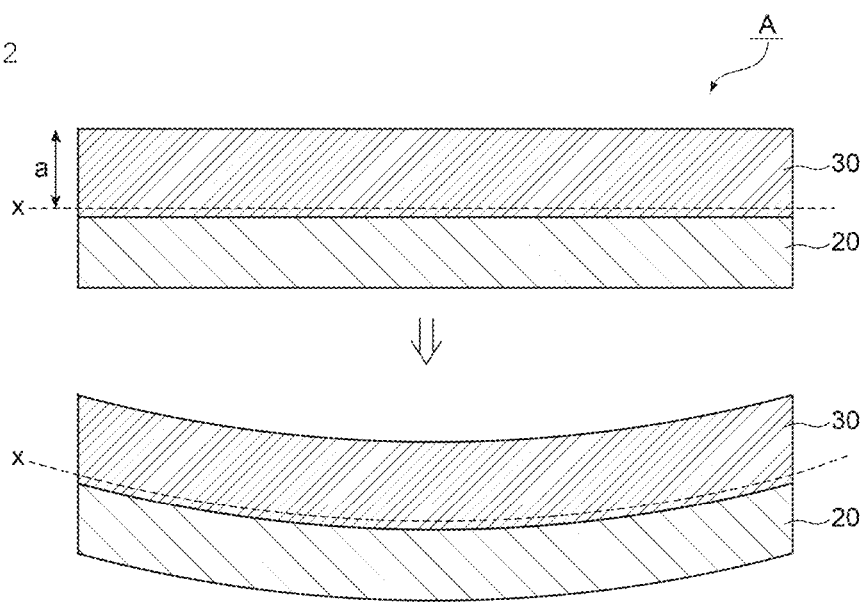
FIG. 2 is a schematic sectional view for illustrating the tendency of warping in a one-side protected polarizing plate.

Meanwhile, a laminate including a protective film on one side of a polarizing film is liable to cause such warping that its protective film side becomes a convex surface because under high temperature, the protective film acts as a layer that thermally expands and the polarizing film acts as a layer that thermally shrinks. In the polarizing plate 100 with a pressure-sensitive adhesive layer as illustrated in FIG. 1, a laminate A including the protective film 20 and the polarizing film 30 tends to warp toward the upper direction of the drawing sheet, but in the present invention, the warping can be suppressed by: arranging the first pressure-sensitive adhesive layer 10; setting the thickness of the polarizing film to 13 µm or less; and setting the thickness ratio between the protective film 20 and the polarizing film 30 (protective film/polarizing film) to 1.5 or more. More specifically, as illustrated in FIG. 2, when the thickness ratio between the protective film and the polarizing film (protective film/polarizing film) is less than 1.5, the ratio of the polarizing film 30 (layer that thermally shrinks) to a portion a to which a compressive stress is applied (portion above a thickness direction central surface x of the laminate A) in the laminate A increases. As a result, there is a risk in that, under high temperature, a bending moment to be applied to the laminate A increases, and hence the warping of the laminate A cannot be prevented. That is, in the present invention, the bending moment to be applied to the laminate A can be reduced by setting the thickness ratio between the protective film and the polarizing film (protective film/polarizing film) to 1.5 or more, and in synergy with the presence of the first pressure-sensitive adhesive layer and the thinning of the polarizing film (reduction in its shrinkage stress), a polarizing plate with a pressure-sensitive adhesive layer that warps to an extremely small extent can be obtained. In such polarizing plate with a pressure-sensitive adhesive layer, interlayer peeling (peeling between the first pressure-sensitive adhesive layer and the protective film) and foaming can be prevented, and appearance abnormality occurring in an end portion of the polarizing plate can be prevented.

As described above, the thickness ratio between the protective film and the polarizing film (protective film/polarizing film) is from 1.5 to 9.0, preferably from 2.0 to 6.5, more preferably from 2.5 to 5.0. When the thickness ratio between the protective film and the polarizing film (protective film/polarizing film) is more than 9.0, a thin polarizing plate with a pressure-sensitive adhesive layer is not obtained.

B. Polarizing Film

The thickness of the polarizing film is 13 µm or less, preferably 10 µm or less, more preferably 7 µm or less, still more preferably 6 µm or less. The use of such thin polarizing film can provide a thin polarizing plate with a pressure-sensitive adhesive layer. In addition, a polarizing plate with a pressure-sensitive adhesive layer that warps to a small extent can be obtained by suppressing the shrinkage stress of the polarizing film. Meanwhile, the thickness of the polarizing film is preferably 1 µm or more, more preferably 2 µm or more.

The modulus of elasticity of the polarizing film at 25° C. is preferably from 1,000 MPa to 10,000 MPa, more preferably from 2,000 MPa to 7,000 MPa, still more preferably from 2,500 MPa to 4,000 MPa. When the modulus of elasticity falls within such range, a polarizing plate with a pressure-sensitive adhesive layer that warps to a small extent can be obtained. The modulus of elasticity of the polarizing film may be adjusted by, for example, the selection of a material constituting the polarizing film and a stretching ratio upon production of the polarizing film. It should be noted that the modulus of elasticity may be measured in conformity with the tensile test method of JIS K 7127. Specifically, the modulus of elasticity may be measured under the following conditions.

Axis of abscissa upon determination of the modulus of elasticity (slope of a graph): Strain (%)
Axis of ordinate upon determination of the modulus of elasticity (slope of the graph): Tensile stress σ (MPa=N/mm$^2$)=F/initial sectional area A (mm$^2$) of a test piece
Range upon determination of the modulus of elasticity (slope of the graph): Linear regression in the strain range of from 0.05% to 0.25%
Test piece shape: Belt shape (length: 100 mm, width: 50 mm)
Chuck-to-chuck distance: 100 mm The coefficient of linear expansion of the polarizing film in its absorption axis direction is preferably $-50 \times 10^{-5}/°$ C. or more, more preferably $-10 \times 10^{-5}/°$ C. or more. The polarizing film shows a negative coefficient of linear expansion (i.e., shrinks in association with a temperature increase) because the film is formed by stretching as described later. The absolute value of the coefficient of linear expansion of the polarizing film is preferably as small as possible, but an upper limit for the coefficient of linear expansion of the polarizing film in the absorption axis direction is, for example, $-1.0 \times 10^{-5}/°$ C. or less, and in one embodiment, is $-4.0 \times 10^{-5}/°$ C. or less. It should be noted that the coefficient of linear expansion is determined in conformity with JIS K 7197.

The polarizing film preferably exhibits absorption dichroism at any wavelength in the wavelength range of from 380 nm to 780 nm. The polarizing film has a single axis transmittance of preferably 40.0% or more, more preferably 41.0% or more, still more preferably 42.0% or more, particularly preferably 43.0% or more. The polarizing film has a polarization degree of preferably 99.8% or more, more preferably 99.9% or more, still more preferably 99.95% or more.

The polarizing film is preferably an iodine-based polarizing film. More specifically, the polarizing film may be formed of an iodine-containing polyvinyl alcohol-based resin (hereinafter referred to as "PVA-based resin") film.

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizing film excellent in durability. When the saponification degree is excessively high, gelling may occur.

The average polymerization degree of the PVA-based resin may be appropriately selected depending on purposes. The average polymerization degree is typically from 1,000 to 10,000, preferably from 1,200 to 5,000, more preferably from 1,500 to 4,500. It should be noted that the average polymerization degree may be determined in conformity with JIS K 6726-1994.

A method of producing the polarizing film is, for example, a method (I) including stretching and dyeing a PVA-based resin film alone, or a method (II) including stretching and dyeing a laminate (i) having a resin base material and a polyvinyl alcohol-based resin layer. Detailed description of the method (I) is omitted because the method is well known and conventionally used in the art. The production method (II) preferably includes the step of stretching and dyeing the laminate (i) having the resin base material and the polyvinyl alcohol-based resin layer formed on one side of the resin base material to produce a polarizing film on the resin base material. The laminate (i) may be formed by applying an application liquid containing a polyvinyl alcohol-based resin onto the resin base material and drying the applied liquid. In addition, the laminate (i) may be formed by transferring a polyvinyl alcohol-based resin film onto the resin base material. For example, Japanese Patent Application Laid-open No. 2012-73580 describes details about the production method (II), and is incorporated herein by reference.

C. Protective Film

Any appropriate resin film may be adopted as the protective film. As a material for forming the protective film, there are given, for example: a cellulose-based resin such as triacetylcellulose (TAC); a cycloolefin-based resin such as a norbornene-based resin; an olefin-based resin such as polyethylene or polypropylene; a polyester-based resin; and a (meth)acrylic resin. It should be noted that the term "(meth)acrylic resin" refers to an acrylic resin and/or a methacrylic resin.

In one embodiment, a (meth)acrylic resin having a glutarimide structure is used as the (meth)acrylic resin. The (meth)acrylic resin having a glutarimide structure (hereinafter sometimes referred to as glutarimide resin) is described in, for example, Japanese Patent Application Laid-open No. 2006-309033, Japanese Patent Application Laid-open No. 2006-317560, Japanese Patent Application Laid-open No. 2006-328329, Japanese Patent Application Laid-open No. 2006-328334, Japanese Patent Application Laid-open No. 2006-337491, Japanese Patent Application Laid-open No. 2006-337492, Japanese Patent Application Laid-open No. 2006-337493, Japanese Patent Application Laid-open No. 2006-337569, Japanese Patent Application Laid-open No. 2007-009182, Japanese Patent Application Laid-open No. 2009-161744, and Japanese Patent Application Laid-open No. 2010-284840. The descriptions thereof are incorporated herein by reference.

The resin film is formed by any appropriate method. Examples of the film-forming method include a melt extrusion method, a solution casting method, a calender method, and a compression forming method. Of those, a melt extrusion method is preferred. In addition, the resin film may be subjected to a stretching treatment.

The protective film and the polarizing film are laminated through any appropriate adhesive layer. A resin base material used at the time of the production of the polarizing film may be peeled before the lamination of the protective film and the polarizing film, or after the lamination.

The thickness of the protective film is preferably from 5 μm to 60 μm, more preferably from 6 μm to 40 μm, still more preferably from 10 μm to 30 μm. When the thickness falls within such range, a polarizing plate with a pressure-sensitive adhesive layer that warps to a small extent can be obtained. It should be noted that the protective film may be subjected to various surface treatments.

The modulus of elasticity of the protective film at 25° C. is preferably from 1,000 MPa to 10,000 MPa, more preferably from 1,200 MPa to 5,000 MPa, still more preferably from 1,300 MPa to 4,000 MPa. When the modulus of elasticity falls within such range, a polarizing plate with a pressure-sensitive adhesive layer that warps to a small extent can be obtained.

The coefficient of linear expansion of the protective film is preferably more than 0/° C., more preferably from $1.0 \times 10^{-6}/°$ C. to $50 \times 10^{-6}/°$ C., still more preferably from $4.0 \times 10^{-6}/°$ C. to $10 \times 10^{-6}/°$ C. When the coefficient of linear expansion falls within such range, a polarizing plate with a pressure-sensitive adhesive layer that warps to a small extent can be obtained. It should be noted that when the protective film has anisotropy, the term "coefficient of linear expansion of the protective film" means a coefficient of linear expansion in a machine direction (MD) at the time of the production of the protective film.

The moisture permeability of the protective film is preferably 1,000 g/m$^2$/24 h or less, more preferably 100 g/m$^2$/24 hr or less, still more preferably 90 g/m$^2$/24 h or less. When the moisture permeability falls within such range, the deterioration of the polarizing film due to moisture can be prevented. It should be noted that the "moisture permeability" is a value determined by measuring the amount (g) of water vapor that passes a sample having an area of 1 m$^2$ within 24 hours in an atmosphere having a temperature of 40° C. and a humidity of 92% RH in conformity with the moisture permeability test (cup method) of JIS Z 0208.

D. First Pressure-sensitive Adhesive Layer

The polarizing plate with a pressure-sensitive adhesive layer of the present invention includes the first pressure-sensitive adhesive layer on the surface of the protective film on a side opposite to the polarizing film, i.e., the outermost side of the polarizing plate with a pressure-sensitive adhesive layer, and can be bonded to any other member through the first pressure-sensitive adhesive layer.

A creep amount when a load of 500 g is applied to the first pressure-sensitive adhesive layer for 1 hour is from 20 μm/h to 300 μm/h, preferably from 30 μm/h to 300 μm/h, more preferably from 40 μm/h to 260 μm/h. Setting the creep amount to such range alleviates the deformation of a laminate including the protective film and the polarizing film (the laminate A in FIG. 1) due to a temperature change, and enables the formation of the first pressure-sensitive adhesive layer that can follow the deformation. In the polarizing plate with a pressure-sensitive adhesive layer of the present invention including such first pressure-sensitive adhesive layer, appearance abnormality occurring in an end portion of the polarizing plate can be prevented. When the creep amount is less than 20 μm/h, there is a risk in that the layer cannot sufficiently follow the deformation of the laminate A and hence an unnecessary stress is applied to the laminate A; in a more unpreferred case, the laminate A and the first pressure-sensitive adhesive layer may separate from each other. In addition, when the creep amount is more than 300 μm/h, there is a risk in that the deformation of the laminate A cannot be sufficiently suppressed, and hence the laminate A and the first pressure-sensitive adhesive layer separate from each other. A specific method of measuring the creep amount is described later.

The first pressure-sensitive adhesive layer may be formed of a pressure-sensitive adhesive containing a pressure-sensitive adhesive base polymer and a cross-linking agent. The creep amount of the first pressure-sensitive adhesive layer may be adjusted by, for example, the molecular weight of the base polymer in the pressure-sensitive adhesive and the addition amount of the cross-linking agent in the pressure-sensitive adhesive. More specifically, the creep amount of the first pressure-sensitive adhesive layer may be reduced by using a polymer having a high molecular weight as the base polymer and/or increasing the addition amount of the cross-linking agent. In addition, the creep amount of the first pressure-sensitive adhesive layer may be increased by using a polymer having a low molecular weight as the base polymer and/or reducing the addition amount of the cross-linking agent.

The thickness of the first pressure-sensitive adhesive layer is preferably from 1 μm to 50 μm, more preferably from 3 μm to 30 μm.

The storage modulus of the first pressure-sensitive adhesive layer at 25° C. is preferably from 0.01 MPa to 0.5 MPa, more preferably from 0.05 MPa to 0.3 MPa, still more preferably from 0.08 MPa to 0.13 MPa. When the storage modulus falls within such range, a polarizing plate with a pressure-sensitive adhesive layer that can be prevented from, for example, peeling and foaming, and is excellent in durability can be obtained. It should be noted that the storage modulus may be determined by subjecting a pressure-sensitive adhesive layer sample measuring 2 mm in thickness by 8 mm in diameter to dynamic viscoelasticity measurement (with, for example, "Advanced Rheometric Expansion System (ARES)" manufactured by Rheometric Scientific, deformation mode: distortion, measurement frequency: Hz, rate of temperature increase: 5° C./min, measurement temperature: −50° C. to 150° C.).

Examples of the pressure-sensitive adhesive include an acrylic pressure-sensitive adhesive, an acrylic urethane-based pressure-sensitive adhesive, a urethane-based pressure-sensitive adhesive, a silicone-based pressure-sensitive adhesive, and an organic-inorganic hybrid pressure-sensitive adhesive. Of those, an acrylic pressure-sensitive adhesive is preferred from the viewpoints of transparency and durability.

An examples of the acrylic pressure-sensitive adhesive is an acrylic pressure-sensitive adhesive whose base polymer is an acrylic polymer (homopolymer or copolymer) using as a monomer component one kind or two or more kinds of (meth)acrylic acid alkyl esters, i.e., a polymer having a constituent unit derived from a (meth)acrylic acid alkyl ester. Specific examples of the (meth)acrylic acid alkyl ester include (meth)acrylic acid C1-20 alkyl esters such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Of those, a (meth)acrylic acid alkyl ester having a linear or branched alkyl group having 4 to 18 carbon atoms may be preferably used. The content of the constituent unit derived from the (meth)acrylic acid alkyl ester is preferably 60 parts by weight or more, more preferably 80 parts by weight or more with respect to 100 parts by weight of the base polymer.

The acrylic polymer may contain a constituent unit derived from any other monomer component copolymerizable with the (meth)acrylic acid alkyl ester as required for the purpose of modification of cohesive strength, heat resistance, cross-linkability, or the like. Examples of such monomer component include: carboxyl group-containing monomers such as acrylic acid, methacrylic acid, carboxyethyl acrylate, carboxypentyl acrylate, itaconic acid, maleic acid, fumaric acid, and crotonic acid; acid anhydride monomers such as maleic anhydride and itaconic anhydride; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth) acryloyloxynaphthalenesulfonic acid.

In one embodiment, a hydroxyl group-containing monomer is used as the monomer component. Examples of the hydroxyl group-containing monomer include 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth) acrylate, 12-hydroxylauryl (meth)acrylate, and (4-hydroxymethylcyclohexyl)-methyl acrylate. Of those, when an isocyanate-based cross-linking agent is used as the cross-linking agent, 4-hydroxybutyl acrylate is suitable from the viewpoint of efficiently securing a cross-linking point with an isocyanate group. The content of the constituent unit derived from the hydroxyl group-containing monomer is preferably from 0.1 part by weight to 10 parts by weight, more preferably from 0.5 part by weight to 2 parts by weight with respect to 100 parts by weight of the base polymer.

In addition, an aromatic ring-containing alkyl (meth) acrylate such as phenoxyethyl (meth)acrylate or benzyl (meth)acrylate may be used from the viewpoints of pressure-sensitive adhesive properties, durability, control of retardation, control of refractive index, and the like. A polymer obtained by polymerizing the aromatic ring-containing alkyl (meth)acrylate may be used by being mixed with the (meth) acrylic polymer exemplified above. The aromatic ring-containing alkyl (meth)acrylate is preferably used by being copolymerized with the alkyl (meth)acrylate from the viewpoint of transparency.

In addition, as monomers for property modification, there are given, for example: an (N-substituted) amide-based monomer such as (meth)acrylamide, N,N-dimethyl(meth) acrylamide, N-butyl(meth)acrylamide, N-methylol(meth) acrylamide, or N-methylolpropane(meth)acrylamide; an alkylaminoalkyl (meth)acrylate-based monomer such as aminoethyl (meth)acrylate, N,N-dimethylaminoethyl (meth) acrylate, or t-butylaminoethyl (meth)acrylate; an alkoxyalkyl (meth)acrylate-based monomer such as methoxyethyl (meth)acrylate or ethoxyethyl (meth)acrylate; a succinimide-based monomer such as N-(meth)acryloyloxymethylenesuccinimide, N-(meth)acryloyl-6-oxyhexamethylenesuccinimide, N-(meth)acryloyl-8-oxyoctamethylenesuccinimide, or N-acryloylmorpholine; a maleimide-based monomer such as N-cyclohexylmaleimide, N-isopropylmaleimide, N-laurylmaleimide, or N-phenylmaleimide; and an itaconimide-based monomer such as N-methylitaconimide, N-ethylitaconimide, N-butylitaconimide, N-octylitaconimide, N-2-ethylhexylitaconimide, N-cyclohexylitaconimide, or N-laurylitaconimide.

Further, as the monomers for property modification, there may also be used, for example: vinyl-based monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate-based monomers such as acrylonitrile and methacrylonitrile; epoxy group-containing acrylic monomers such as glycidyl (meth)acrylate; glycol-based acrylic ester monomers such as polyethylene glycol (meth) acrylate, polypropylene glycol (meth) acrylate, methoxyethylene glycol (meth)acrylate, and methoxypolypropylene glycol (meth)acrylate; and acrylic acid ester-based monomers such as tetrahydrofurfuryl (meth)acrylate, a fluorinated(meth)acrylate, a silicone (meth)acrylate, and 2-methoxyethyl acrylate. Further, there are given, for example, isoprene, butadiene, isobutylene, and vinyl ether.

Further, as the copolymerizable monomer except the ones described above, there is given, for example, a silane-based monomer, which contains a silicon atom. Examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

In one embodiment, the base polymer is substantially free of a constituent unit derived from a carboxyl group-containing monomer. The use of such base polymer can provide a polarizing plate with a pressure-sensitive adhesive layer that can suppress the deterioration of an adherend. It should be noted that the phrase "substantially free" means that the content of the constituent unit derived from a carboxyl group-containing monomer is 0.7 wt % or less with respect to all constituent units constituting the base polymer. The content of the constituent unit derived from a carboxyl group-containing monomer is preferably 0.5 wt % or less, more preferably 0.3 wt % or less, still more preferably 0.1 wt % or less with respect to all constituent units constituting the base polymer, and it is most preferred that the base polymer be free of the constituent unit derived from a carboxyl group-containing monomer.

The weight-average molecular weight of the base polymer is preferably from 800,000 to 3,000,000, more preferably from 1,000,000 to 2,500,000, still more preferably from 1,400,000 to 2,000,000. When the weight-average molecular weight falls within such range, the first pressure-sensitive adhesive layer that shows an appropriate creep amount can be formed. It should be noted that the weight-average molecular weight is determined from a value measured by gel permeation chromatography (GPC; solvent: THF) and calculated in terms of polystyrene.

Examples of the cross-linking agent include an isocyanate-based cross-linking agent, an epoxy-based cross-linking agent, a peroxide-based cross-linking agent, a melamine-based cross-linking agent, a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and a amine-based cross-linking agent. Of those, an isocyanate-based cross-linking agent, an epoxy-based cross-linking agent, and/or a peroxide-based cross-linking agent is preferably used. The cross-linking agents may be used alone or in combination.

It is preferred that the pressure-sensitive adhesive contain as the cross-linking agent a plurality of kinds of cross-linking agents. It is more preferred that the plurality of kinds of cross-linking agents be selected from the group consisting of a peroxide-based cross-linking agent, an epoxy-based cross-linking agent, and an isocyanate-based cross-linking agent. The combined use of the plurality of kinds of cross-linking agents as just described allows efficient formation of a three-dimensional cross-linked network of the pressure-sensitive adhesive layer. As a result, the occurrence of the appearance abnormality in an end portion of the polarizing plate can be additionally effectively prevented.

Any appropriate cross-linking agent may be used as the isocyanate-based cross-linking agent. Examples of the isocyanate-based cross-linking agent include: isocyanate monomers such as tolylene diisocyanate, chlorophenylene diisocyanate, tetramethylene diisocyanate, xylylene diisocyanate, diphenylmethane diisocyanate, and hydrogenated diphenylmethane diisocyanate; and an isocyanate compound obtained by addition of a polyol such as trimethylolpropane to any one of the isocyanate monomers.

Any appropriate cross-linking agent may be used as the epoxy-based cross-linking agent. For example, an epoxy-based resin having in its molecule two or more epoxy groups is used as the epoxy-based cross-linking agent. Specific examples thereof include diglycidylaniline, 1,3-bis(N,N-glycidylaminomethyl)cyclohexane, N,N,N',N'-tetraglycidyl-m-xylenediamine, 1,6-hexanediol diglycidyl ether, neopentyl glycol diglycidyl ether, ethylene glycol diglycidyl ether, and propylene glycol diglycidyl ether.

Any appropriate cross-linking agent may be used as the peroxide-based cross-linking agent. Examples of the peroxide-based cross-linking agent include dibenzoyl peroxide, di(2-ethylhexyl) peroxydicarbonate, di(4-t-butylcyclohexyl) peroxydicarbonate, di-sec-butyl peroxydicarbonate, t-butyl peroxyneodecanoate, t-hexyl peroxypivalate, and t-butyl peroxypivalate.

The addition amount of the cross-linking agent is preferably from 0.01 part by weight to 5 parts by weight, more preferably from 0.02 part by weight to 3 parts by weight, still more preferably from 0.1 part by weight to 2.5 parts by weight, particularly preferably from 0.4 part by weight to 1 part by weight with respect to 100 parts by weight of the base polymer. When the addition amount falls within such range, the first pressure-sensitive adhesive layer that shows an appropriate creep amount can be formed.

In one embodiment, the pressure-sensitive adhesive for forming the first pressure-sensitive adhesive layer may further contain an ionic compound. The ionic compound has an anion component and a cation component. The addition of the ionic compound allows the formation of the pressure-sensitive adhesive layer having an antistatic function.

Examples of the anion component include a bis(heptafluoropropanesulfonyl)imide anion, a bis(nonafluorobutanesulfonyl)imide anion, a bis(undecafluoropentanesulfonyl)imide anion, a bis(tridecafluorohexanesulfonyl)imide anion, a bis(pentadecafluoroheptanesulfonyl)imide anion, a cyclohexafluoropropane-1,3-bis(sulfonyl)imide anion, a hexafluoropropane-1,3-disulfonic acid anion, a bis(trifluoromethanesulfonyl)imide anion, a trifluoromethanesulfonyl anion, and a pentafluoroethanesulfonyl anion. Of those, a bis(trifluoromethanesulfonyl)imide anion is preferred.

Examples of the cation component include alkali metal ions of lithium, sodium, and potassium. Of those, a lithium ion is preferred. An alkali metal salt as the ionic compound may be formed of the anion component and the cation component.

An organic cation may be used as the cation component. Specific examples of the organic cation include a pyridinium cation, a piperidinium cation, a pyrrolidinium cation, a cation having a pyrroline skeleton, a cation having a pyrrole skeleton, an imidazolium cation, a tetrahydropyrimidinium cation, a dihydropyrimidinium cation, a pyrazolium cation, a pyrazolinium cation, a tetraalkylammonium cation, a trialkylsulfonium cation, and a tetraalkylphosphonium cation. Of those organic cations, a pyrrolidinium cation is preferred.

The addition amount of the ionic compound is preferably from 0.1 part by weight to 5 parts by weight, more preferably from 0.5 part by weight to 3 parts by weight with respect to 100 parts by weight of the base polymer.

In one embodiment, the pressure-sensitive adhesive for forming the first pressure-sensitive adhesive layer may further contain an antioxidant. Examples of the antioxidant include phenol-based, phosphorus-based, sulfur-based, and amine-based antioxidants. Of those, a phenol-based antioxidant is preferred. The antioxidants may be used alone or in combination.

The use of the pressure-sensitive adhesive containing the antioxidant can prevent appearance abnormality in an end portion of the polarizing plate. Further, when the peroxide-based cross-linking agent and the antioxidant are used in combination, the inhibition of radical cross-linking by oxygen is effectively suppressed by the antioxidant, whereby the three-dimensional cross-linked network of the pressure-sensitive adhesive layer is efficiently formed. As a result, the appearance abnormality in the end portion of the polarizing plate can be prevented in an additionally effective manner.

The addition amount of the antioxidant is preferably from 0.005 part by weight to 2 parts by weight, more preferably from 0.1 part by weight to 1 part by weight with respect to 100 parts by weight of the base polymer. When the addition amount falls within such range, appearance abnormality in an end portion of the polarizing plate can be prevented.

In one embodiment, the pressure-sensitive adhesive for forming the first pressure-sensitive adhesive layer may further contain a silane coupling agent. Examples of the silane coupling agent include: epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane; (meth)acrylic group-containing silane coupling agents; and isocyanate group-containing silane coupling agents.

The addition amount of the silane coupling agent is preferably from 0.01 part by weight to 1 part by weight, more preferably from 0.05 part by weight to 0.5 part by weight with respect to 100 parts by weight of the base polymer.

The pressure-sensitive adhesive may further contain any appropriate additive as required. Examples of the additive include a tackifier, a plasticizer, a pigment, a dye, a filler, an anti-aging agent, a conductive material, an ultraviolet absorber, a photostabilizer, a peeling adjusting agent, a softener, a surfactant, and a flame retardant.

E. Method of producing Polarizing Plate with Pressure-sensitive Adhesive Layer

The polarizing plate with a pressure-sensitive adhesive layer may be produced by any appropriate production method. The method of producing the polarizing plate with a pressure-sensitive adhesive layer includes, for example, the steps of: laminating the polarizing film and the protective film; and forming the first pressure-sensitive adhesive layer on the protective film. In one embodiment, the polarizing plate with a pressure-sensitive adhesive layer may be formed into an elongated shape (e.g., 300 m or more).

In one embodiment, the lamination of the polarizing film and the protective film is performed by a roll-to-roll process. It is preferred that an elongated polarizing film that is obtained in a method of producing a polarizing film to be described in the section B-1 through a MD stretching step and has an absorption axis in its lengthwise direction, and an elongated protective film be laminated through an adhesive layer to provide a laminate of the polarizing film and the protective film. The lamination of the polarizing film and the protective film is preferably performed under heating. When an adhesive (described later) constituting the adhesive layer is an aqueous adhesive or a solvent-based adhesive, a heating temperature is a temperature at which the adhesive dries, and when the adhesive is an active energy ray-curable adhesive, the heating temperature is a temperature at which the adhesive cures. The heating temperature is preferably 50° C. or more, more preferably 55° C. or more, still more preferably 60° C. or more. Meanwhile, the heating temperature is preferably 80° C. or less. It should be noted that the heating to be performed upon lamination of the protective film may also serve as a drying treatment for the laminate. The thickness of the adhesive layer is preferably from 0.01 μm to 7 μm, more preferably from 0.01 μm to 5 μm, still more preferably from 0.01 μm to 2 μm, most preferably from 0.01 μm to 1 μm.

The adhesive layer for bonding the polarizing film and the protective film is formed of any appropriate adhesive. The adhesive may be an aqueous adhesive, may be a solvent-based adhesive, or may be an active energy ray-curable adhesive.

Any appropriate adhesive may be used as the active energy ray-curable adhesive as long as the adhesive can be cured by being irradiated with an active energy ray. Examples of the active energy ray-curable adhesive include a UV-curable adhesive and an electron beam-curable adhesive. Specific examples of the curing type of the active energy ray-curable adhesive include a radical curing type, a cation curing type, an anion curing type, and a combination thereof (e.g., a hybrid of the radical curing type and the cation curing type).

Examples of the active energy ray-curable adhesive include adhesives containing, as curable components, compounds (such as monomers and/or oligomers) each having a radically polymerizable group such as a (meth)acrylate group or a (meth)acrylamide group.

Specific examples of the active energy ray-curable adhesive and a method of curing the adhesive are described in, for example, Japanese Patent Application Laid-open No. 2012-144690. The description is incorporated herein by reference.

Any appropriate aqueous adhesive may be adopted as the aqueous adhesive. An aqueous adhesive containing a PVA-based resin is preferably used. The average polymerization degree of the PVA-based resin to be incorporated into the aqueous adhesive is preferably from about 100 to 5,500, more preferably from 1,000 to 4,500 in terms of an adhesive property. The average saponification degree of the PVA-based resin is preferably from about 85 mol % to 100 mol %, more preferably from 90 mol % to 100 mol % in terms of the adhesive property.

The PVA-based resin to be incorporated into the aqueous adhesive preferably contains an acetoacetyl group. This is because adhesiveness between a PVA-based resin layer and the protective film is excellent, and the polarizing plate can be excellent in durability. An acetoacetyl group-containing PVA-based resin is obtained by, for example, causing the PVA-based resin and diketene to react with each other according to any appropriate method. The acetoacetyl group modification degree of the acetoacetyl group-containing PVA-based resin is typically 0.1 mol % or more, preferably from about 0.1 mol % to 40 mol %, more preferably from 1 mol % to 20 mol %, still more preferably from 1 mol % to 7 mol %. It should be noted that the acetoacetyl group modification degree is a value measured by NMR.

The resin concentration of the aqueous adhesive is preferably from 0.1 wt % to 15 wt %, more preferably from 0.5 wt % to 10 wt %.

In the step of forming the first pressure-sensitive adhesive layer on the protective film, the first pressure-sensitive adhesive layer is formed by, for example, applying the pressure-sensitive adhesive described in the section D onto the protective film and then cross-linking (polymerizing) the pressure-sensitive adhesive. Any appropriate method may be adopted as a method for the cross-linking. In addition, the first pressure-sensitive adhesive layer formed on another base material may be transferred onto the protective film.

In one embodiment, an anchor layer is arranged between the protective film and the first pressure-sensitive adhesive layer. Arranging the anchor layer can improve adhesiveness between the protective film and the first pressure-sensitive adhesive layer. A material for forming the anchor layer is not particularly limited, and various polymers, gels of metal oxides, silica sol, or the like may be used. Of those, polymers are preferred. The form of each of the polymers may be any of a solvent-soluble type, a water-dispersion type, or a water-soluble type.

The anchor layer may further contain any appropriate additive as required. Examples of the additive include an antistatic agent, an antioxidant, an ultraviolet absorber, a pH adjusting agent, a deterioration inhibitor, and a surfactant.

The antistatic agent is not particularly limited as long as it is a material that can impart conductivity, and examples thereof include an ionic surfactant, a conductive polymer, a metal oxide, carbon black, and a carbon nanomaterial. Of those, a conductive polymer is preferred, and a water-dispersible conductive polymer is more preferred.

Any appropriate method may be adopted as a method of forming the anchor layer. In addition, the protective film may be subjected to an activation treatment before the formation of the anchor layer. Examples of the activation treatment include a corona treatment, a low-pressure UV treatment, and a plasma treatment.

The thickness of the anchor layer is preferably from 5 nm to 300 nm from the viewpoint of thinning.

F. Optical Laminate

Figure 3:
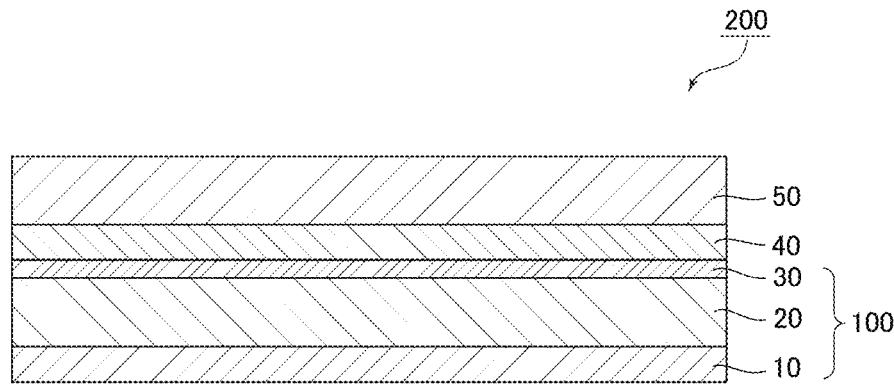
FIG. 3 is a schematic sectional view of an optical laminate according to one embodiment of the present invention.

FIG. 3 is a schematic sectional view of an optical laminate according to one embodiment of the present invention. An optical laminate 200 of FIG. 3 includes the polarizing plate 100 with a pressure-sensitive adhesive layer, a second pressure-sensitive adhesive layer 40, and an optical film 50. The polarizing plate with a pressure-sensitive adhesive layer described in the sections A to D may be used as the polarizing plate 100 with a pressure-sensitive adhesive layer. That is, the polarizing plate 100 with a pressure-sensitive adhesive layer includes the first pressure-sensitive adhesive layer 10, the protective film 20, and the polarizing film 30 in the stated order. The second pressure-sensitive adhesive layer 40 is arranged on the surface of the polarizing film 30 on a side opposite to the protective film 20. When the optical laminate is constituted by combining the polarizing plate with a pressure-sensitive adhesive layer and the optical film (having a positive coefficient of linear expansion), the warping of the polarizing plate with a pressure-sensitive adhesive layer is suppressed by the optical film, and hence the effects of the present invention become additionally significant.

The thickness of the optical laminate is preferably 100 μm or less, more preferably 90 μm or less, still more preferably from 40 μm to 80 μm.

When the surface of the optical laminate on the protective film side and a non-alkali glass are bonded to each other through a pressure-sensitive adhesive, and the optical laminate is placed under a 70° C. environment for 200 hours, the shrinkage ratio of the optical laminate in the absorption axis direction of the polarizing film is preferably 0.4% or less, more preferably 0.3% or less, still more preferably 0.2% or less. When the shrinkage ratio falls within such range, an optical laminate that warps to a small extent is obtained, and in the optical laminate, appearance abnormality occurring in an end portion of the polarizing plate can be prevented. Any appropriate pressure-sensitive adhesive may be used as the pressure-sensitive adhesive.

G. Optical Film

Any appropriate optical film may be used as the optical film depending on the applications of the optical laminate. Examples of the optical film include: brightness enhancement films; retardation films; and films with surface-treated layers having various surface-treated layers such as a hard coat layer, an antiglare layer, and an antireflection layer. Of those, a brightness enhancement film is preferred.

The thickness of the optical film is preferably from 10 μm to 30 μm, more preferably from 10 μm to 25 μm, still more preferably from 12 μm to 22 μm.

The moisture permeability of the optical film is preferably 500 g/m²/24 h or less, more preferably 300 g/m²/24 h or less, still more preferably from 1 g/m²/24 h to 100 g/m²/24 h. When the moisture permeability falls within such range, the deterioration of the polarizing film due to moisture can be prevented.

Figure 4:
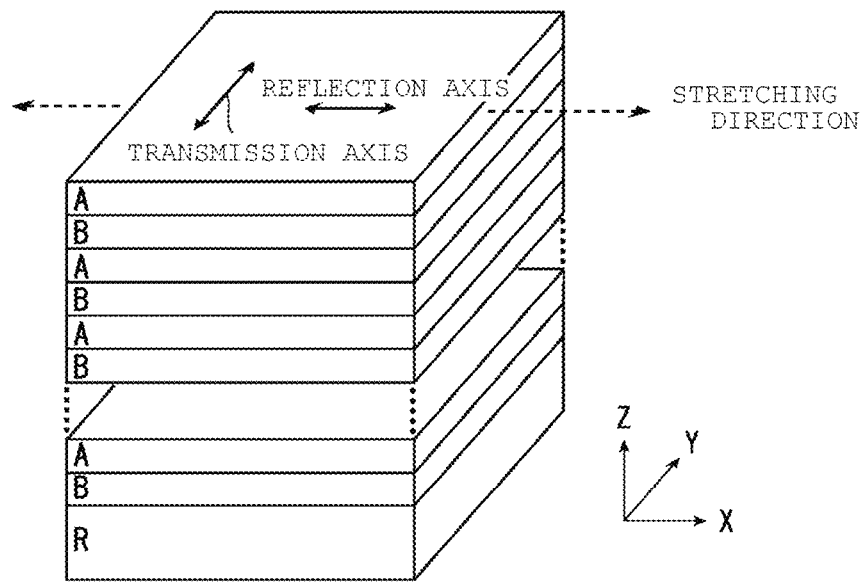
FIG. 4 is a schematic perspective view for illustrating an example of a linearly polarized light-separating film to be used in the optical laminate of the present invention.
Figure 5:
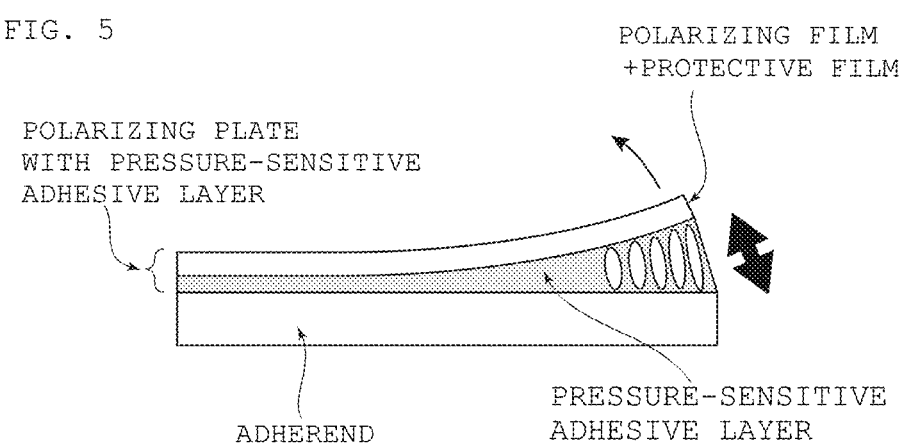
FIG. 5 is a schematic view for illustrating the tendency of warping in a one-side protected polarizing plate.

In one embodiment, a linearly polarized light-separating film is used as the brightness enhancement film. FIG. 4 is a schematic perspective view for illustrating an example of the linearly polarized light-separating film. The linearly polarized light-separating film is preferably a multilayer laminate in which a layer A having birefringence and a layer B having substantially no birefringence are alternately laminated. In, for example, the illustrated example, a refractive index n(X) of the layer A in an X-axis direction is larger than a refractive index n(Y) thereof in a Y-axis direction, and the refractive index n(X) of the layer B in the X-axis direction and the refractive index n(Y) thereof in the Y-axis direction are substantially the same. Therefore, a difference in refractive index between the layer A and the layer B is large in the X-axis direction, and is substantially zero in the Y-axis direction. As a result, the X-axis direction serves as a reflection axis and the Y-axis direction serves as a transmission axis. The difference in refractive index between the layer A and the layer B in the X-axis direction is preferably from 0.2 to 0.3.

The layer A is preferably formed of a material that expresses birefringence through stretching. Typical examples of such material include naphthalene dicarboxylic acid polyester (such as polyethylene naphthalate), polycarbonate, and an acrylic resin (such as polymethyl methacrylate). Of those, polyethylene naphthalate or polycarbonate is preferred in terms of low moisture permeability. The layer B is preferably formed of a material that expresses substantially no birefringence even when stretched. Such material is typically, for example, the copolyester of naphthalene dicarboxylic acid and terephthalic acid.

At an interface between the layer A and the layer B, the linearly polarized light-separating film transmits light having a first polarization direction (such as a p-wave), and reflects light having a second polarization direction perpendicular to the first polarization direction (such as an s-wave). At the interface between the layer A and the layer B, part of the reflected light is transmitted as light having the first polarization direction, and the other part thereof is reflected as light having the second polarization direction. Such reflection and transmission are repeated many times in the linearly polarized light-separating film, and hence the utilization efficiency of light can be improved.

The linearly polarized light-separating film preferably includes a reflective layer R as the outermost layer opposite to the polarizing film as illustrated in FIG. 4. Arranging the reflective layer R enables additional utilization of light that has finally returned to the outermost portion of the linearly polarized light-separating film without being utilized, and hence can additionally improve the utilization efficiency of light. The reflective layer R typically expresses its reflecting function by virtue of the multilayer structure of a polyester resin layer.

The linearly polarized light-separating film and the polarizing film are preferably laminated so that the transmission axis of the linearly polarized light-separating film and the absorption axis of the polarizing film may be substantially perpendicular to each other. The phrase "substantially perpendicular" as used herein comprehends the case where an angle formed between the two optical axes is 90°±2°, and the angle is preferably 90°±1°.

The entire thickness of the linearly polarized light-separating film may be appropriately set depending on, for example, a purpose and the total number of layers in the linearly polarized light-separating film. The entire thickness of the linearly polarized light-separating film is preferably 30 μm or less, more preferably from 10 μm to 30 μm, still more preferably from 20 μm to 30 μm.

For example, a film described in Japanese Patent Translation Publication No. Hei 9-507308 may be used as the linearly polarized light-separating film.

A commercial product may be used as it is as the linearly polarized light-separating film, or a product obtained by subjecting the commercial product to secondary processing (such as stretching) may be used. Examples of the commercial product include a product available under the trade name "DBEF" from 3M Company and a product available under the trade name "APF" from 3M Company.

H. Second Pressure-sensitive Adhesive Layer

The polarizing film and the linearly polarized light-separating film are laminated through the second pressure-sensitive adhesive layer.

The second pressure-sensitive adhesive layer is formed of any appropriate pressure-sensitive adhesive. Preferred examples thereof include an acrylic pressure-sensitive adhesive, an acrylic urethane-based pressure-sensitive adhesive, a urethane-based pressure-sensitive adhesive, a silicone-based pressure-sensitive adhesive, an organic-inorganic hybrid pressure-sensitive adhesive, and a rubber-based pressure-sensitive adhesive. Of those, an acrylic pressure-sensitive adhesive is preferred. The acrylic pressure-sensitive adhesive is excellent in transparency and heat resistance. In addition, the affinity of the acrylic pressure-sensitive adhesive for water can be easily adjusted by its formulated composition, and thus a hydrophobic pressure-sensitive adhesive can be easily obtained by the acrylic pressure-sensitive adhesive. The use of a highly hydrophobic acrylic pressure-sensitive adhesive enables the formation of a pressure-sensitive adhesive layer having low moisture permeability, and can prevent the deterioration of the polarizing film.

A water-insoluble pressure-sensitive adhesive is preferably used as the pressure-sensitive adhesive for forming the second pressure-sensitive adhesive layer. The use of the water-insoluble pressure-sensitive adhesive enables the formation of a pressure-sensitive adhesive layer having low moisture permeability, and can prevent the deterioration of the polarizing film due to water.

The thickness of the second pressure-sensitive adhesive layer is preferably from 3 μm to 18 μm, more preferably from 3 μm to 15 μm, still more preferably from 4 μm to 12 μm.

The saturated water content of the second pressure-sensitive adhesive layer is preferably 3.5 wt % or less, more preferably from 0 wt % to 2 wt %, still more preferably from 0 wt % to 1.5 wt %, particularly preferably from 0 wt % to 1 wt %, most preferably from 0 wt % to 0.5 wt %. When the saturated water content of the second pressure-sensitive adhesive layer exceeds 3.5 wt %, there is a risk in that the extent to which water moves to the protective film enlarges, and hence the expansion or shrinkage of the protective film enlarges. The saturated water content may be determined from a weight (W1) after the removal of water by the drying of about 50 mg of the pressure-sensitive adhesive layer at 100° C. for 1 hour or more and the weight (W2) of the pressure-sensitive adhesive layer in a state where water in the layer is saturated by using the following equation. It should be noted that the measurement may be performed with, for example, a water adsorption-desorption measuring apparatus (e.g., IGA-Sorp manufactured by Hiden Isochema Ltd.). In addition, the weight of the pressure-sensitive adhesive layer in a state where water in the layer is saturated refers to the weight of the pressure-sensitive adhesive layer in a state where its weight change over time is eliminated by the placement of the pressure-sensitive adhesive layer under humidification for a predetermined time period. For example, the weight of the pressure-sensitive adhesive layer in a state where the weight change over time is eliminated by the standing of the pressure-sensitive adhesive layer after the drying under a 23° C./0% RH environment for 2 hours, under a 23° C./55% RH environment for 5 hours, under a 60° C./90% RH environment for 5 hours, and under the 23° C./55% RH environment for 5 hours may be defined as the weight W2.

Saturated water content (wt %)=$(B-A)/A \times 100$

I. Method of producing Optical Laminate

The optical laminate may be produced by any appropriate production method. A method of producing the optical laminate includes: a step a of forming the polarizing plate with a pressure-sensitive adhesive layer; a step b of forming the second pressure-sensitive adhesive layer on the optical film to provide a laminate I; and a step c of laminating the polarizing plate with a pressure-sensitive adhesive layer and the laminate I.

The polarizing plate with a pressure-sensitive adhesive layer may be produced by, for example, the method described in the section E.

In the step b, the second pressure-sensitive adhesive layer is formed on the optical film by applying a pressure-sensitive adhesive to the optical film. With the construction in which the pressure-sensitive adhesive layer (first pressure-sensitive adhesive layer) is arranged between the optical film and the polarizing film, the optical film with a pressure-sensitive adhesive layer (laminate I) may be prepared in a roll shape at the time of the production of the polarizing plate with a pressure-sensitive adhesive layer. When the laminate I is prepared in a roll shape, the bonding of the polarizing plate with a pressure-sensitive adhesive layer and the laminate I (step c) can be performed by a roll-to-roll process.

In the step c, the polarizing film of the polarizing plate with a pressure-sensitive adhesive layer and the optical film of the laminate I are bonded to each other through the second pressure-sensitive adhesive layer.

EXAMPLES

The present invention is specifically described below by way of Examples. However, the present invention is not limited to Examples below.

Production Example 1

Protective Film (Production of Acrylic Film)

A methacrylic resin pellet having a glutarimide ring unit was dried at 100.5 kPa and 100° C. for 12 hours, and was extruded by using a uniaxial extruder from a T-die at a die temperature of 270° C. to be formed into a film shape. Further, the film was stretched in its conveying direction under an atmosphere having a temperature higher than the Tg of the resin by 10° C., and was then stretched in a direction perpendicular to the film-conveying direction under an atmosphere having a temperature higher than the Tg of the resin by 7° C. to provide a protective film A constituted of an acrylic resin (thickness: 20 μm, modulus of elasticity: 2,000 MPa).

Similarly, a protective film B having a thickness of 30 μm, a protective film C having a thickness of 40 μm, a protective film D having a thickness of 50 μm, and a protective film E having a thickness of 25 μm were obtained.

Production Example 2

Production of Laminate (A-1)

An amorphous isophthalic acid-copolymerized polyethylene terephthalate (IPA-copolymerized PET) film of an elongated shape having a coefficient of water absorption of 0.75% and a Tg of 75° C. (thickness: 100 μm) was used as a thermoplastic resin base material.

One surface of the resin base material was subjected to a corona treatment. An aqueous solution containing polyvinyl alcohol (polymerization degree: 4,200, saponification degree: 99.2 mol %) and acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z-200") at a ratio of 9:1 was applied to the corona-treated surface at 25° C. and dried to form a PVA-based resin layer having a thickness of 11 μm. Thus, a laminate a was produced.

The resultant laminate a was subjected to free-end uniaxial stretching at a stretching ratio of 2.0 times in its longitudinal direction (lengthwise direction) between rolls having different peripheral speeds in an oven at 120° C. (aerial auxiliary stretching).

Next, the laminate a was immersed in an insolubilizing bath having a liquid temperature of 30° C. (aqueous solution of boric acid obtained by compounding 100 parts by weight of water with 4 parts by weight of boric acid) for 30 seconds (insolubilizing treatment).

Next, the laminate a was immersed in a dyeing bath having a liquid temperature of 30° C. while its iodine concentration and an immersion time were adjusted so that the polarizing film had a predetermined transmittance. In this example, the laminate was immersed in an aqueous solution of iodine obtained by compounding 100 parts by weight of water with 0.2 part by weight of iodine and 1.0 part by weight of potassium iodide for 60 seconds (dyeing treatment).

Next, the laminate a was immersed in a cross-linking bath having a liquid temperature of 30° C. (aqueous solution of boric acid obtained by compounding 100 parts by weight of water with 3 parts by weight of potassium iodide and 3 parts by weight of boric acid) for 30 seconds (cross-linking treatment).

After that, the laminate a was subjected to uniaxial stretching so as to achieve a total stretching ratio of 5.5 times in the longitudinal direction (lengthwise direction) between rolls having different peripheral speeds while being immersed in an aqueous solution of boric acid having a liquid temperature of 70° C. (aqueous solution obtained by compounding 100 parts by weight of water with 4 parts by weight of boric acid and 5 parts by weight of potassium iodide) (underwater stretching).

After that, the laminate a was immersed in a washing bath having a liquid temperature of 30° C. (aqueous solution obtained by compounding 100 parts by weight of water with 4 parts by weight of potassium iodide) (washing treatment).

Subsequently, an aqueous solution of a PVA-based resin (manufactured by The Nippon Synthetic Chemical Industry Co., Ltd., trade name: "GOHSEFIMER (trademark) Z-200", resin concentration: 3 wt %) was applied to the surface of the PVA-based resin layer of the laminate a, and the protective film A obtained in Production Example 1 (thickness: 20 µm) was laminated on the applied solution. After that, the resultant was heated in an oven maintained at 60° C. for 5 minutes. Thus, a laminate A-1 having a polarizing film having a thickness of 5 µm (protective film (20 µm)/polarizing film (5 µm)/thermoplastic resin base material) was produced.

Production Example 3

Production of Laminate (A-2)

A laminate A-2 (protective film (30 µm)/polarizing film (5 µm)/thermoplastic resin base material) was produced in the same manner as in Production Example 2 except that the protective film B (thickness: 30 µm) was used instead of the protective film A (thickness: 20 µm).

Production Example 4

Production of Laminate (A-3)

A laminate A-3 (protective film (40 µm)/polarizing film (5 µm)/thermoplastic resin base material) was produced in the same manner as in Production Example 2 except that the protective film C (thickness: 40 µm) was used instead of the protective film A (thickness: 20 µm).

Production Example 5

Production of Laminate (A-4)

A laminate A-4 (protective film (50 µm)/polarizing film (5 µm)/thermoplastic resin base material) was produced in the same manner as in Production Example 2 except that the protective film D (thickness: 50 µm) was used instead of the protective film A (thickness: 20 µm).

Production Example 6

Production of Laminate (A-5)

A laminate A-5 (protective film (25 µm)/polarizing film (20 µm)/thermoplastic resin base material) was produced in the same manner as in Production Example 2 except that: a polarizing film having a thickness of 20 µm was produced; and the protective film E (thickness: 25 µm) was used instead of the protective film A (thickness: 20 µm).

Production Example 7

Production of Laminate (A-6)

A laminate a-6 (thermoplastic resin base material/polarizing film (20 µm)/protective film (40 µm)) was produced in the same manner as in Production Example 2 except that: a polarizing film having a thickness of 20 µm was produced; and the protective film C (thickness: 40 µm) was used instead of the protective film A (thickness: 20 µm).

After the thermoplastic resin base material had been peeled from the laminate a-6, the protective film A (thickness: 20 µm) was laminated as another protective film on the polarizing film by the same method as that described in Production Example 2. Thus, a laminate A-6 (protective film (40 µm)/polarizing film (20 µm)/another protective film (20 µm)) was produced.

Production Example 8

Preparation of (Meth)acrylic Polymer (B-1)

99 Parts by weight of butyl acrylate, 1 part by weight of 4-hydroxybutyl acrylate, and 1 part by weight of AIBN as an initiator were loaded into a reaction vessel mounted with a cooling tube, a nitrogen-introducing tube, a temperature gauge, and a stirring device together with ethyl acetate, and the mixture was subjected to a reaction in a stream of a nitrogen gas at 60° C. for 7 hours. After that, ethyl acetate was added to the reaction liquid. Thus, a solution containing a (meth)acrylic polymer (B-1) having a weight-average molecular weight of 1,600,000 was obtained (solid content concentration: 30 wt %).

Production Example 9

Preparation of (Meth)acrylic Polymer (B-2)

98.5 Parts by weight of butyl acrylate, 1 part by weight of 4-hydroxybutyl acrylate, 0.5 part by weight of acrylic acid, and 1 part by weight of AIBN as an initiator were loaded into a reaction vessel mounted with a cooling tube, a nitrogen-introducing tube, a temperature gauge, and a stirring device together with ethyl acetate, and the mixture was subjected to a reaction in a stream of a nitrogen gas at 60° C. for 7 hours. After that, ethyl acetate was added to the reaction liquid. Thus, a solution containing a (meth)acrylic polymer (B-2) having a weight-average molecular weight of 1,650,000 was obtained (solid content concentration: 30 wt %).

Production Example 10

Preparation of (Meth)acrylic Polymer (B-3)

95 Parts by weight of butyl acrylate, 1 part by weight of 4-hydroxybutyl acrylate, 4 parts by weight of acrylic acid, and 1 part by weight of AIBN as an initiator were loaded into a reaction vessel mounted with a cooling tube, a nitrogen-introducing tube, a temperature gauge, and a stirring device together with ethyl acetate, and the mixture was subjected to a reaction in a stream of a nitrogen gas at 60° C. for 7 hours. After that, ethyl acetate was added to the reaction liquid. Thus, a solution containing a (meth)acrylic polymer (B-3) having a weight-average molecular weight of 1,700,000 was obtained (solid content concentration: 30 wt %).

Production Example 11

Preparation of (Meth)acrylic Polymer (B-4)

99 Parts by weight of butyl acrylate, 1 part by weight of 2-hydroxyethyl acrylate, and 1 part by weight of AIBN as an initiator were loaded into a reaction vessel mounted with a cooling tube, a nitrogen-introducing tube, a temperature gauge, and a stirring device together with ethyl acetate, and the mixture was subjected to a reaction in a stream of a nitrogen gas at 60° C. for 7 hours. After that, ethyl acetate was added to the reaction liquid. Thus, a solution containing a (meth)acrylic polymer (B-4) having a weight-average molecular weight of 1,600,000 was obtained (solid content concentration: 30 wt %).

Example 1

Production of Optical Laminate
(Preparation of Pressure-sensitive Adhesive)

The solution containing the (meth)acrylic polymer (B-1) obtained in Production Example 8 was compounded with 0.1 part by weight of trimethylolpropane xylylene diisocyanate (manufactured by Mitsui Chemicals, Inc., trade name: "TAKENATE D110N") and 0.3 part by weight of dibenzoyl peroxide as cross-linking agents, 0.1 part by weight of γ-glycidoxypropylmethoxysilane (manufactured by Shin-Etsu Chemical Co., Ltd., trade name: "KBM-403") as a silane coupling agent, 1 part by weight of lithium trifluoromethanesulfonylimide (manufactured by Morita Chemical Industries Co., Ltd.) as an antistatic agent, and 0.3 part by weight of pentaerythritol tetrakis[3-(3,5-di-tert-butyl-4-hydroxyphenyl)propionate] (manufactured by BASF Japan Ltd., trade name: "IRGANOX 1010") as a phenol-based antioxidant per 100 parts by weight of the solid content of the solution. Thus, a pressure-sensitive adhesive solution was obtained.

(Production of Polarizing Plate with Pressure-sensitive Adhesive Layer)

The resultant pressure-sensitive adhesive solution was uniformly applied to the surface of a polyethylene terephthalate film (base material) treated with a silicone-based peeling agent by using a fountain coater, and was dried in an air-circulating thermostatic oven at 155° C. for 2 minutes. Thus, a pressure-sensitive adhesive layer having a thickness of 20 μm was formed on the surface of the base material. Next, the pressure-sensitive adhesive layer (first pressure-sensitive adhesive layer) was transferred onto the protective film of the laminate A-1 (thermoplastic resin base material/polarizing film/protective film), and then the thermoplastic resin base material was peeled. Thus, a polarizing plate with a pressure-sensitive adhesive layer (first pressure-sensitive adhesive layer (20 μm)/protective film/polarizing film) was obtained.

(Production of Optical Laminate)

A brightness enhancement film having a thickness of 20 μm (manufactured by Nitto Denko Corporation, trade name: "PCF350") was bonded onto the polarizing film of the resultant polarizing plate with a pressure-sensitive adhesive layer through a second pressure-sensitive adhesive layer constituted of an acrylic pressure-sensitive adhesive (thickness: 10 μm). Thus, an optical laminate (first pressure-sensitive adhesive layer/protective film/polarizing film/second pressure-sensitive adhesive layer/brightness enhancement film) was obtained.

Production of Optical Laminate

Examples 2 to 16 and 19, and Comparative Examples 1 to 3

Optical laminates were each obtained in the same manner as in Example 1 except that: those shown in Table 1 were used as the laminate including the polarizing film and the protective film, the (meth)acrylic polymer, and the cross-linking agent; and the thickness of the first pressure-sensitive adhesive layer was set to a thickness shown in Table 1. It should be noted that 1,3-bis(N,N-glycidylaminomethyl)cyclohexane (manufactured by Mitsubishi Gas Chemical Company, Inc., trade name: "TETRAD-C") was used as an epoxy-based cross-linking agent.

TABLE 1

| | | | Pressure-sensitive adhesive | | | |
| | | | | Cross-linking agent | | |
| | Laminate of protective film and polarizing film | (Meth)acrylic polymer Kind | Compounding amount (part(s) by weight) | Peroxide-based cross-linking agent (dibenzoyl peroxide) Compounding amount (part(s) by weight) | Isocyanate-based cross-linking agent (trimethylolpropane xylylene diisocyanate) Compounding amount (part(s) by weight) | Epoxy-based cross-linking agent (1,3-bis(N,N-glycidylaminomethyl)cyclohexane) Compounding amount (part(s) by weight) |
|---|---|---|---|---|---|---|
| Example 1 | A-1 | B-1 | 100 | 0.3 | 0.1 | — |
| Example 2 | A-2 | B-1 | 100 | 0.3 | 0.1 | — |
| Example 3 | A-3 | B-1 | 100 | 0.3 | 0.1 | — |
| Example 4 | A-2 | B-1 | 100 | 0.3 | 0.1 | — |
| Example 5 | A-2 | B-1 | 100 | 0.3 | 0.1 | — |
| Example 6 | A-2 | B-1 | 100 | 0.3 | 0.1 | — |
| Example 7 | A-2 | B-1 | 100 | — | 0.07 | — |
| Example 8 | A-1 | B-1 | 100 | — | 0.02 | — |
| Example 9 | A-2 | B-1 | 100 | — | 2.5 | — |

TABLE 1-continued

| | | | | | | |
|---|---|---|---|---|---|---|
| Example 10 | A-2 | B-1 | 100 | — | 5 | — |
| Example 11 | A-2 | B-2 | 100 | — | 0.1 | 0.3 |
| Example 12 | A-2 | B-1 | 100 | — | 2.5 | — |
| Example 13 | A-3 | B-1 | 100 | 0.3 | 0.1 | 0.2 |
| Example 14 | A-1 | B-2 | 100 | 0.3 | 0.1 | 0.2 |
| Example 15 | A-1 | B-4 | 100 | 0.3 | 0.1 | — |
| Example 16 | A-1 | B-1 | 100 | 0.3 | 0.1 | — |
| Example 17 | A-2 | B-1 | 100 | 0.3 | 0.1 | — |
| Example 18 | A-3 | B-1 | 100 | 0.3 | 0.1 | — |
| Example 19 | A-1 | B-1 | 100 | 0.3 | 0.1 | — |
| Comparative Example 1 | A-4 | B-1 | 100 | 0.3 | 0.1 | — |
| Comparative Example 2 | A-2 | B-1 | 100 | 0.3 | 0.1 | 0.2 |
| Comparative Example 3 | A-5 | B-1 | 100 | 0.3 | 0.1 | — |
| Comparative Example 4 | A-1 | B-1 | 100 | 0.3 | 0.1 | — |
| Comparative Example 5 | A-1 | B-3 | 100 | 0.3 | 0.1 | — |
| Reference Example 1 | A-6 | B-1 | 100 | 0.3 | 0.1 | — |

| | Pressure-sensitive adhesive | | | |
|---|---|---|---|---|
| | Silane coupling agent (γ-glycidoxy-propyl-methoxysilane) Compounding amount (part(s) by weight) | Phenol-based antioxidant (pentaerythritol tetrakis[3-(3,5-di-tert-butyl-4-hydroxyphen-yl)propionate]) Compounding amount (part(s) by weight) | Ionic compound (lithium trifluoro-methane-sulfonylimide) Compounding amount (part(s) by weight) | Thickness of pressure-sensitive adhesive layer (μm) |
| Example 1 | 0.1 | 0.3 | 1 | 20 |
| Example 2 | 0.1 | 0.3 | 1 | 20 |
| Example 3 | 0.1 | 0.3 | 1 | 20 |
| Example 4 | 0.1 | 0.3 | 1 | 30 |
| Example 5 | 0.1 | 0.3 | 1 | 10 |
| Example 6 | 0.1 | 0.3 | 1 | 5 |
| Example 7 | 0.1 | 0.3 | 1 | 20 |
| Example 8 | 0.1 | 0.3 | 1 | 20 |
| Example 9 | 0.1 | 0.3 | 1 | 20 |
| Example 10 | 0.1 | 0.3 | 1 | 20 |
| Example 11 | 0.1 | 0.3 | 1 | 20 |
| Example 12 | 0.1 | 0.3 | 1 | 20 |
| Example 13 | 0.1 | 0.3 | 1 | 30 |
| Example 14 | 0.1 | 0.3 | 1 | 20 |
| Example 15 | 0.1 | 0.3 | 1 | 20 |
| Example 16 | 0.1 | — | 1 | 20 |
| Example 17 | 0.1 | 0.3 | 1 | 20 |
| Example 18 | 0.1 | 0.3 | 1 | 20 |
| Example 19 | 0.3 | 0.3 | — | 20 |
| Comparative Example 1 | 0.1 | 0.3 | 1 | 20 |
| Comparative Example 2 | 0.1 | 0.3 | 1 | 5 |
| Comparative Example 3 | 0.1 | 0.3 | 1 | 20 |
| Comparative Example 4 | 0.1 | 0.3 | 1 | 20 |
| Comparative Example 5 | 0.1 | 0.3 | — | 20 |
| Reference Example 1 | 0.1 | 0.3 | 1 | 20 |

Example 17

Production of Polarizing Plate with Pressure-sensitive Adhesive Layer (Preparation of Pressure-sensitive Adhesive)

The solution containing the (meth)acrylic polymer (B-1) obtained in Production Example 8 was compounded with 0.1 part by weight of trimethylolpropane xylylene diisocyanate (manufactured by Mitsui Chemicals, Inc., trade name: "TAKENATE D110N") and 0.3 part by weight of dibenzoyl peroxide as cross-linking agents, 0.1 part by weight of γ-glycidoxypropylmethoxysilane (manufactured by Shin-Etsu Chemical Co., Ltd., trade name: "KBM-403") as a silane coupling agent, 1 part by weight of lithium trifluoromethanesulfonylimide (manufactured by Morita Chemical Industries Co., Ltd.) as an antistatic agent, and 0.3 part by weight of pentaerythritol tetrakis[3-(3,5-di-tert-butyl-4-hydroxyphenyl)propionate] (manufactured by BASF Japan Ltd., trade name: "IRGANOX 1010") as a phenol-based antioxidant per 100 parts by weight of the solid content of the solution. Thus, a pressure-sensitive adhesive solution was obtained.

(Production of Polarizing Plate with Pressure-sensitive Adhesive Layer)

The resultant pressure-sensitive adhesive solution was uniformly applied to the surface of a polyethylene terephthalate film (base material) treated with a silicone-based peeling agent by using a fountain coater, and was dried in an air-circulating thermostatic oven at 155° C. for 2 minutes. Thus, a pressure-sensitive adhesive layer having a thickness of 20 μm was formed on the surface of the base material. Next, the pressure-sensitive adhesive layer (first pressure-sensitive adhesive layer) was transferred onto the protective film of the laminate A-2 (thermoplastic resin base material/polarizing film/protective film), and then the thermoplastic resin base material was peeled. Thus, a polarizing plate with a pressure-sensitive adhesive layer (first pressure-sensitive adhesive layer (20 μm)/protective film/polarizing film) was obtained.

Example 18

Production of Polarizing Plate with Pressure-sensitive Adhesive Layer

A polarizing plate with a pressure-sensitive adhesive layer was obtained in the same manner as in Example 16 except that the laminate A-3 was used instead of the laminate A-2.

Comparative Example 4

Production of Optical Laminate
(Preparation of Pressure-sensitive Adhesive)

The solution containing the (meth)acrylic polymer (B-1) obtained in Production Example 8 was compounded with 0.1 part by weight of trimethylolpropane xylylene diisocyanate (manufactured by Mitsui Chemicals, Inc., trade name: "TAKENATE D110N") and 0.3 part by weight of dibenzoyl peroxide as cross-linking agents, 0.1 part by weight of γ-glycidoxypropylmethoxysilane (manufactured by Shin-Etsu Chemical Co., Ltd., trade name: "KBM-403") as a silane coupling agent, 1 part by weight of lithium trifluoromethanesulfonylimide (manufactured by Morita Chemical Industries Co., Ltd.) as an antistatic agent, and 0.3 part by weight of pentaerythritol tetrakis[3-(3,5-di-tert-butyl-4-hydroxyphenyl)propionate] (manufactured by BASF Japan Ltd., trade name: "IRGANOX 1010") as a phenol-based antioxidant per 100 parts by weight of the solid content of the solution. Thus, a pressure-sensitive adhesive solution was obtained.

(Production of Polarizing Plate with Pressure-sensitive Adhesive Layer)

The resultant pressure-sensitive adhesive solution was uniformly applied to the surface of a polyethylene terephthalate film (base material) treated with a silicone-based peeling agent by using a fountain coater, and was dried in an air-circulating thermostatic oven at 155° C. for 2 minutes. Thus, a pressure-sensitive adhesive layer having a thickness of 20 μm was formed on the surface of the base material. Next, after the thermoplastic resin base material had been peeled from the laminate A-1 (thermoplastic resin base material/polarizing film/protective film), the pressure-sensitive adhesive layer (first pressure-sensitive adhesive layer) was transferred onto the polarizing film. Thus, a polarizing plate with a pressure-sensitive adhesive layer (first pressure-sensitive adhesive layer (20 μm)/polarizing film/protective film) was obtained.

(Production of Optical Laminate)

A brightness enhancement film having a thickness of 20 μm (manufactured by Nitto Denko Corporation, trade name: "PCF350") was bonded onto the protective film of the resultant polarizing plate with a pressure-sensitive adhesive layer through a second pressure-sensitive adhesive layer constituted of an acrylic pressure-sensitive adhesive (thickness: 10 μm). Thus, an optical laminate (first pressure-sensitive adhesive layer/polarizing film/protective film/second pressure-sensitive adhesive layer/brightness enhancement film) was obtained.

Comparative Example 5

Production of Optical Laminate

A pressure-sensitive adhesive solution was obtained in the same manner as in Comparative Example 4 except that: the (meth)acrylic polymer (B-3) obtained in Production Example 10 was used instead of the solution containing the (meth)acrylic polymer (B-1) obtained in Production Example 8; and lithium trifluoromethanesulfonylimide (manufactured by Morita Chemical Industries Co., Ltd.) was not used.

A polarizing plate with a pressure-sensitive adhesive layer and an optical laminate were obtained in the same manner as in Comparative Example 4 except that the pressure-sensitive adhesive solution thus obtained was used.

Reference Example 1

Production of Optical Laminate

A polarizing plate with a pressure-sensitive adhesive layer (first pressure-sensitive adhesive layer/protective film/polarizing film/another protective film) was obtained in the same manner as in Example 1 except that the laminate A-6 was used instead of the laminate A-1.

A brightness enhancement film having a thickness of 20 μm (manufactured by Nitto Denko Corporation, trade name: "PCF350") was bonded onto the another protective film of the resultant polarizing plate with a pressure-sensitive adhesive layer through a second pressure-sensitive adhesive layer constituted of an acrylic pressure-sensitive adhesive (thickness: 10 μm). Thus, an optical laminate (first pressure-sensitive adhesive layer/protective film/polarizing film/another protective film/second pressure-sensitive adhesive layer/brightness enhancement film) was obtained.

<Evaluation>

The optical laminates or polarizing plates with pressure-sensitive adhesive layers obtained in Examples, Comparative Examples, and Reference Example were subjected to the following evaluations. The results are shown in Table 2.

(Creep Amount of First Pressure-sensitive Adhesive Layer)

An end portion (measuring 10 mm wide by 10 mm long) of a sample (an optical laminate or a polarizing plate with a pressure-sensitive adhesive layer) cut so as to measure 10 mm wide by 50 mm long was bonded to a stainless plate through a first pressure-sensitive adhesive layer, and the resultant was treated in an autoclave at 50° C. and 5 atmospheres for 15 minutes, followed by standing at room temperature for 1 hour. After that, the shift amount (deformation amount) of the first pressure-sensitive adhesive layer when a load of 500 g (tensile load) was applied to an end portion opposite to the end portion bonded to the stainless plate under 23° C. for 1 hour was measured, and the measured value was defined as the creep amount of the first pressure-sensitive adhesive layer (laser-type creep tester).

(Durability Evaluation 1-1)

An evaluation sample was produced by bonding the first pressure-sensitive adhesive layer side of an optical laminate or a polarizing plate with a pressure-sensitive adhesive layer to a non-alkali glass (manufactured by Corning Incorporated, trade name: "EG-XG", thickness: 0.7 mm). The evaluation sample was treated in an autoclave at 50° C. and 5 atmospheres for 15 minutes, and was then loaded into an oven at 80° C. and left to stand for 500 hours.

The presence or absence of the peeling and foaming of the optical laminate or the polarizing plate with a pressure-sensitive adhesive layer after a lapse of 500 hours was visually observed.

In the table, a product in which neither peeling nor foaming was observed was evaluated as ⊚, a product in which peeling or foaming that could not be visually observed was observed was evaluated as ○, a product in which slight peeling or foaming that was able to be visually observed was observed was evaluated as Δ, and a product in which distinct peeling or foaming was observed was evaluated as x.

In addition, the sample was loaded into a 60° C./90% RH thermo-hygrostat and left to stand for 500 hours, followed by an evaluation for its durability by the same criteria as those described above.

(Durability Evaluation 1-2)

An evaluation for durability was performed by the same method and criteria as those of Durability Evaluation 1-1 except that an evaluation sample was produced by bonding the first pressure-sensitive adhesive layer side of an optical laminate or a polarizing plate with a pressure-sensitive adhesive layer to the ITO layer of a glass substrate with an ITO layer. It should be noted that the glass substrate with an ITO layer was produced by forming the ITO layer on one surface of an inorganic glass according to a sputtering method. In addition, the glass substrate with an ITO layer was subjected to a heat treatment at 140° C. for 30 minutes before the optical laminate or the polarizing plate with a pressure-sensitive adhesive layer and the substrate were bonded to each other. The Sn ratio (weight of Sn atoms/(weight of Sn atoms+weight of In atoms)) of the ITO layer was 3 wt %.

(Durability Evaluation 2-1)

An evaluation sample was produced by bonding the first pressure-sensitive adhesive layer side of an optical laminate or a polarizing plate with a pressure-sensitive adhesive layer to a non-alkali glass (manufactured by Corning Incorporated, trade name: "EG-XG", thickness: 0.7 mm). The evaluation sample was treated in an autoclave at 50° C. and 5 atmospheres for 15 minutes, and was then loaded into an oven at 80° C. and left to stand for 500 hours.

With regard to the optical laminate or the polarizing plate with a pressure-sensitive adhesive layer after a lapse of 500 hours, a lightness difference in an end portion of the polarizing plate caused by light leakage due to crossed Nicols was observed.

In the table, a product in which appearance abnormality in the end portion due to the lightness difference was absent was evaluated as ○, and a product in which appearance abnormality was present was evaluated as x.

In addition, the sample was loaded into a 60° C./90% RH thermo-hygrostat and left to stand for 500 hours, followed by an evaluation for its durability by the same criteria as those described above.

Figure 6A:
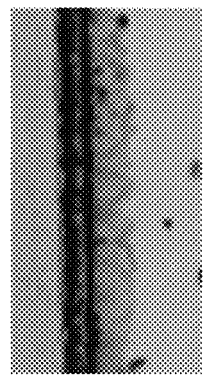
FIG. 6A is a microphotograph of an end portion of a polarizing plate of Example 1 and FIG. 6B is a microphotograph of an end portion of a polarizing plate of Comparative Example 1.
Figure 6B:
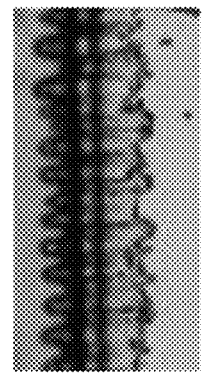

In addition, a microphotograph of an end portion of the polarizing plate of Example 1 is shown in FIG. 6A, and a microphotograph of an end portion of the polarizing plate of Comparative Example 1 is shown in FIG. 6B.

(Durability Evaluation 2-2)

An evaluation for durability was performed by the same method and criteria as those of Durability Evaluation 2-1 except that an evaluation sample was produced by bonding the first pressure-sensitive adhesive layer side of an optical laminate or a polarizing plate with a pressure-sensitive adhesive layer to the ITO layer of a glass substrate with an ITO layer. The glass substrate with an ITO layer was the same as the substrate used in (Durability Evaluation 1-2).

(Deterioration of First Pressure-sensitive Adhesive Layer)

As the initial surface resistance value of a first pressure-sensitive adhesive layer, the surface resistance value (Ω/□) of the first pressure-sensitive adhesive layer of an optical laminate or a polarizing plate with a pressure-sensitive adhesive layer immediately after production was measured with MCP-HT450 manufactured by Mitsubishi Chemical Analytech Co., Ltd., and the measured value was defined as an "initial resistance value."

After that, the sample for measurement was loaded into an environment having a temperature of 60° C. and a humidity of 90% for 500 hours, and then its resistance value was similarly measured. The measured value was defined as a "resistance value after heat and humidity."

A resistance value change ratio was calculated from the "initial resistance value" and the "resistance value after heat and humidity" by using the following equation, and an evaluation was performed by the following evaluation criteria.

Resistance value change ratio (%)=((resistance value after heat and humidity)/(initial resistance value))×100

(Evaluation Criteria)

○: The surface resistance value change ratio is less than 500% (the percentage by which the surface resistance value of the pressure-sensitive adhesive layer is increased by heat and humidity is small, and hence the extent to which the pressure-sensitive adhesive layer deteriorates is small).

x: The surface resistance value change ratio is 500% or more (the percentage by which the surface resistance value of the pressure-sensitive adhesive layer is increased by heat and humidity is large, and hence the extent to which the pressure-sensitive adhesive layer deteriorates is large).

(Deterioration of Adherend)

A conductive film having an amorphous ITO layer formed on its surface (manufactured by Nitto Denko Corporation, trade name: "ELECRYSTA (P400L)") was cut so as to measure 15 mm by 15 mm, and an optical laminate or a polarizing plate with a pressure-sensitive adhesive layer (measuring 8 mm by 8 mm) obtained in any one of Examples and the like was bonded to a central portion on the conductive film. After that, the resultant was treated in an autoclave at 50° C. and 5 atm for 15 minutes. Thus, an evaluation sample was produced.

The surface resistance value of the conductive film having formed thereon the ITO layer to which the optical laminate or the polarizing plate with a pressure-sensitive adhesive layer obtained in any one of Examples and the like had been bonded was measured with HL5500PC manufactured by Accent Optical Technologies Inc., and the measured value was defined as an "initial resistance value."

After that, the sample for measurement was loaded into an environment having a temperature of 60° C. and a humidity of 90% for 500 hours, and then its resistance value was similarly measured. The measured value was defined as a "resistance value after heat and humidity."

A resistance value change ratio was calculated from the "initial resistance value" and the "resistance value after heat and humidity" by using the following equation, and an evaluation was performed by the following evaluation criteria.

Resistance value change ratio (%)=((resistance value after heat and humidity)/(initial resistance value))×100

(Evaluation Criteria)

○: The resistance value change ratio is less than 200% (the percentage by which the resistance value is increased by heat and humidity is small, and hence the extent to which the adherend deteriorates is large).

x: The resistance value change ratio is 200% or more (the percentage by which the resistance value is increased by heat and humidity is large, and hence the extent to which the adherend deteriorates is small).

TABLE 2

|  | Construction of polarizing plate | Laminate of protective film and polarizing film | Thickness of protective film | Thickness of polarizing film | Thickness ratio (thickness of protective film/ thickness of polarizing film) | Thickness of first pressure-sensitive adhesive layer |
|---|---|---|---|---|---|---|
| Example 1 | First pressure-sensitive adhesive layer/protective film/polarizing film | A-1 | 20 | 5 | 4 | 20 |
| Example 2 | | A-2 | 30 | 5 | 6 | 20 |
| Example 3 | | A-3 | 40 | 5 | 8 | 20 |
| Example 4 | | A-2 | 30 | 5 | 6 | 30 |
| Example 5 | | A-2 | 30 | 5 | 6 | 10 |
| Example 6 | | A-2 | 30 | 5 | 6 | 5 |
| Example 7 | | A-2 | 30 | 5 | 6 | 20 |
| Example 8 | | A-1 | 20 | 5 | 4 | 20 |
| Example 9 | | A-2 | 30 | 5 | 6 | 20 |
| Example 10 | | A-2 | 30 | 5 | 6 | 20 |
| Example 11 | | A-2 | 30 | 5 | 6 | 20 |
| Example 12 | | A-2 | 30 | 5 | 6 | 20 |
| Example 13 | | A-3 | 40 | 5 | 8 | 30 |
| Example 14 | | A-1 | 20 | 5 | 4 | 20 |
| Example 15 | | A-1 | 20 | 5 | 4 | 20 |
| Example 16 | | A-1 | 20 | 5 | 4 | 20 |
| Example 17 | | A-2 | 30 | 5 | 6 | 20 |
| Example 18 | | A-3 | 40 | 5 | 8 | 20 |
| Example 19 | | A-1 | 20 | 5 | 4 | 20 |
| Comparative Example 1 | | A-4 | 50 | 5 | 10 | 15 |
| Comparative Example 2 | | A-2 | 30 | 5 | 6 | 5 |
| Comparative Example 3 | | A-5 | 25 | 20 | 1.25 | 20 |
| Comparative Example 4 | First pressure-sensitive | A-1 | 30 | 5 | 6 | 20 |
| Comparative Example 5 | adhesive layer/polarizing film/protective film | A-1 | 30 | 5 | 6 | 20 |
| Reference Example 1 | First pressure-sensitive adhesive layer/protective film/polarizing film/another protective film | A-6 | 20 | 20 | 1 | 20 |

|  |  |  | Evaluation | | | |
|---|---|---|---|---|---|---|
|  | Creep amount of first pressure-sensitive adhesive layer | Presence or absence of brightness enhancement film | Durability Evaluation 1-1 (peeling or the like) | Durability Evaluation 2-1 (end portion abnormality) | Durability Evaluation 1-1 (peeling or the like) | Durability Evaluation 2-1 (end portion abnormality) |
|  |  |  | Heating | | Humidification | |
|  |  |  | Adherend: non-alkali glass | | | |
| Example 1 | 120 | Present | ⊚ | ○ | ⊚ | ○ |
| Example 2 | 120 |  | ⊚ | ○ | ⊚ | ○ |
| Example 3 | 120 |  | ⊚ | ○ | ⊚ | ○ |
| Example 4 | 180 |  | ○ | ○ | ⊚ | ○ |
| Example 5 | 60 |  | ⊚ | ○ | ⊚ | ○ |
| Example 6 | 35 |  | ○ | ○ | ○ | ○ |
| Example 7 | 180 |  | ○ | ○ | ○ | ○ |
| Example 8 | 260 |  | ○ | ○ | ○ | ○ |
| Example 9 | 60 |  | ⊚ | ○ | ○ | ○ |
| Example 10 | 40 |  | ○ | ○ | ○ | ○ |

TABLE 2-continued

| | | | Durability Evaluation 1-1 (peeling or the like) Heating | Durability Evaluation 2-1 (end portion abnormality) | Durability Evaluation 1-1 (peeling or the like) Humidification | Durability Evaluation 2-1 (end portion abnormality) |
|---|---|---|---|---|---|---|
| Example 11 | 80 | | ⊚ | ○ | ○ | ○ |
| Example 12 | 60 | | ⊚ | ○ | ○ | ○ |
| Example 13 | 120 | | ○ | ○ | ⊚ | ○ |
| Example 14 | 100 | | ⊚ | ○ | ⊚ | ○ |
| Example 15 | 120 | | ○ | ○ | ⊚ | ○ |
| Example 16 | 120 | | ⊚ | ○ | ⊚ | ○ |
| Example 17 | 120 | Absent | ⊚ | ○ | ○ | ○ |
| Example 18 | 120 | | ⊚ | ○ | ○ | ○ |
| Example 19 | 120 | Present | ⊚ | ○ | ⊚ | ○ |
| Comparative Example 1 | 120 | | ⊚ | X | ⊚ | ○ |
| Comparative Example 2 | 15 | | ⊚ | ○ | Δ | ○ |
| Comparative Example 3 | 120 | | X | X | Δ | X |
| Comparative Example 4 | 120 | | ⊚ | ○ | ⊚ | ○ |
| Comparative Example 5 | 120 | | ⊚ | ○ | ⊚ | ○ |
| Reference Example 1 | 120 | | ⊚ | ○ | ⊚ | ○ |

| | Evaluation | | | | | |
|---|---|---|---|---|---|---|
| | Durability Evaluation 1-2 (peeling or the like) Heating | Durability Evaluation 2-2 (end portion abnormality) | Durability Evaluation 1-2 (peeling or the like) Humidification | Durability Evaluation 2-2 (end portion abnormality) | Deterioration of adherend | Deterioration of first pressure-sensitive adhesive layer |
| | Adherend: ITO glass | | | | | |
| Example 1 | ⊚ | ○ | ⊚ | ○ | ○ | ○ |
| Example 2 | ⊚ | ○ | ⊚ | ○ | ○ | ○ |
| Example 3 | ⊚ | ○ | ⊚ | ○ | ○ | ○ |
| Example 4 | ○ | ○ | ⊚ | ○ | ○ | ○ |
| Example 5 | ⊚ | ○ | ⊚ | ○ | ○ | ○ |
| Example 6 | ○ | ○ | ○ | ○ | ○ | ○ |
| Example 7 | ○ | ○ | ⊚ | ○ | ○ | ○ |
| Example 8 | ○ | ○ | ⊚ | ○ | ○ | ○ |
| Example 9 | ⊚ | ○ | ⊚ | ○ | ○ | ○ |
| Example 10 | ○ | ○ | ○ | ○ | ○ | ○ |
| Example 11 | ⊚ | ○ | ⊚ | ○ | ○ | ○ |
| Example 12 | ⊚ | ○ | ⊚ | ○ | ○ | ○ |
| Example 13 | ○ | ○ | ⊚ | ○ | ○ | ○ |
| Example 14 | ⊚ | ○ | ⊚ | ○ | ○ | ○ |
| Example 15 | ○ | ○ | ○ | ○ | ○ | ○ |
| Example 16 | ⊚ | ○ | ⊚ | ○ | ○ | ○ |
| Example 17 | ⊚ | ○ | ○ | ○ | ○ | ○ |
| Example 18 | ⊚ | ○ | ○ | ○ | ○ | ○ |
| Example 19 | ⊚ | ○ | ⊚ | ○ | ○ | ○ |
| Comparative Example 1 | ⊚ | X | ⊚ | ○ | ○ | ○ |
| Comparative Example 2 | Δ | ○ | ○ | ○ | ○ | ○ |
| Comparative Example 3 | X | X | Δ | X | ○ | ○ |
| Comparative Example 4 | ⊚ | ○ | ⊚ | ○ | X | X |
| Comparative Example 5 | ⊚ | ○ | ⊚ | ○ | X | X |
| Reference Example 1 | ⊚ | ○ | ⊚ | ○ | ○ | ○ |

The polarizing plate with a pressure-sensitive adhesive layer of the present invention is suitably used for liquid crystal televisions, liquid crystal displays, liquid crystal panels of, for example, mobile phones, digital cameras, video cameras, portable game machines, car navigation systems, copying machines, printers, facsimile machines, timepieces, and microwave ovens, and anti-reflection plates of organic EL devices.

What is claimed is:

1. A polarizing plate with a pressure-sensitive adhesive layer, comprising a first pressure-sensitive adhesive layer, a protective film, and a polarizing film in the stated order, wherein the protective film is arranged on one side only of the polarizing film, and wherein:
   the polarizing film has a thickness of 7 μm or less;
   a thickness ratio between the protective film and the polarizing film (thickness of the protective film/thickness of the polarizing film) is from 2.0 to 8.0; and
   a creep amount when a load of 500 g is applied to the first pressure-sensitive adhesive layer for 1 hour is from 20 μm/h to 300 μm/h.

2. The polarizing plate with a pressure-sensitive adhesive layer according to claim 1, wherein the protective film has a thickness of from 5 μm to 60 μm.

3. The polarizing plate with a pressure-sensitive adhesive layer according to claim 1, wherein the first pressure-sensitive adhesive layer contains an acrylic pressure-sensitive adhesive.

4. The polarizing plate with a pressure-sensitive adhesive layer according to claim 3, wherein the acrylic pressure-sensitive adhesive contains an acrylic polymer as a base polymer, and the acrylic polymer is substantially free of a constituent unit having a carboxyl group.

5. The polarizing plate with a pressure-sensitive adhesive layer according to claim 3, wherein the acrylic pressure-sensitive adhesive contains an acrylic polymer as a base polymer, and the acrylic polymer contains a constituent unit derived from a (meth)acrylic acid alkyl ester and a constituent unit derived from a hydroxyl group-containing monomer.

6. The polarizing plate with a pressure-sensitive adhesive layer according to claim 5, wherein the hydroxyl group-containing monomer comprises 4-hydroxybutyl acrylate.

7. The polarizing plate with a pressure-sensitive adhesive layer according to claim 3, wherein the acrylic pressure-sensitive adhesive contains a phenol-based antioxidant.

8. The polarizing plate with a pressure-sensitive adhesive layer according to claim 3, wherein:
the acrylic pressure-sensitive adhesive contains a base polymer and a plurality of kinds of cross-linking agents; and
the plurality of kinds of cross-linking agents each comprise one of a peroxide-based cross-linking agent, an epoxy-based cross-linking agent, and an isocyanate-based cross-linking agent.

9. An optical laminate, comprising the polarizing plate with a pressure-sensitive adhesive layer of claim 1, a second pressure-sensitive adhesive layer, and an optical film in the stated order, wherein the second pressure-sensitive adhesive layer is arranged on a surface of the polarizing film of the polarizing plate with a pressure-sensitive adhesive layer on a side opposite to the protective film.

10. The optical laminate according to claim 9, wherein the second pressure-sensitive adhesive layer has a thickness of from 3 µm to 18 µm.

11. The optical laminate according to claim 9, wherein the optical film has a thickness of from 10 µm to 30 µm.

12. The optical laminate according to claim 9, wherein the optical film comprises a brightness enhancement film.

13. The optical laminate according to claim 9, wherein the optical laminate has a thickness of 100 µm or less.

14. The optical laminate according to claim 9, wherein when a surface of the optical laminate on a protective film side and a non-alkali glass are bonded to each other through a pressure-sensitive adhesive, and the optical laminate is placed under a 70° C. environment for 200 hours, a shrinkage ratio of the optical laminate in an absorption axis direction of the polarizing film is 0.4% or less.

15. A method of producing the optical laminate of claim 9, comprising:
producing each of the polarizing plate with a pressure-sensitive adhesive layer of claim 1, and a laminate I of the optical film and the second pressure-sensitive adhesive layer; and
laminating the polarizing plate with a pressure-sensitive adhesive layer and the laminate I.

* * * * *